United States Patent
Okamura et al.

(10) Patent No.: US 7,974,828 B2
(45) Date of Patent: Jul. 5, 2011

(54) SIMULATION DEVICE FOR PROGRAMMABLE CONTROLLER

(75) Inventors: Kotaro Okamura, Kusatsu (JP); Yutsuka Shigemori, Otsu (JP)

(73) Assignee: OMRON Corporation, Kyoto (JP)

( * ) Notice: Subject to any disclaimer, the term of this patent is extended or adjusted under 35 U.S.C. 154(b) by 690 days.

(21) Appl. No.: 12/108,776

(22) Filed: Apr. 24, 2008

(65) Prior Publication Data

US 2008/0281575 A1 Nov. 13, 2008

(30) Foreign Application Priority Data

Apr. 27, 2007 (JP) ................. 2007-120295

(51) Int. Cl.
*G06F 9/455* (2006.01)
(52) U.S. Cl. .......................................... 703/23
(58) Field of Classification Search ....................... 703/23
See application file for complete search history.

(56) References Cited

U.S. PATENT DOCUMENTS

2005/0033457 A1 2/2005 Yamane

FOREIGN PATENT DOCUMENTS

| GB | 2403051 | 12/2004 |
|---|---|---|
| JP | 2004258926 | 9/2004 |

OTHER PUBLICATIONS

EP patent application No. 08155285.3, European Search Report mailed Jul. 6, 2009.

*Primary Examiner* — Hugh Jones
(74) *Attorney, Agent, or Firm* — Weaver Austin Villeneuve & Sampson LLP

(57) ABSTRACT

A simulation device for a programmable controller is formed by realizing by software on a computer a virtual PLC for emulating operations of a real PLC, a tool that functions as a development aid device for the virtual PLC and an error simulator for emulating an error that occurs in the virtual PLC. The virtual PLC and the error simulator are structured such that the simulation device is adapted to set, without any operations by the tool, a specified condition at a corresponding address in an error memory of the virtual PLC by carrying out a specified error selection operation and a specified operation regarding presence and absence of error generation, based on a list display of error items on the computer screen, after causing desired PLC type data stored in a PLC type memory in the virtual PLC through the tool.

4 Claims, 27 Drawing Sheets

| ADDRESS | NAME | EXPLANATION | SETUP |
|---|---|---|---|
| A40114 | I/O bus error flag (operation stop error) | It becomes 1(ON) when there is an error in data transmission between the CPU unit and the unit set at each slot or when the end cover is not connected to the right-hand side of the CPU device or the additional device. The operation of the CPU unit is stopped. At this time, ERR/ALM LED on the front surface of the CPU unit is switched on. When the error is cleared, it becomes 0(OFF). | 1: error 0: normal |
| A40115 | Memory error flag (operation stop error) | It becomes 1(ON) when an error is generated in the memory. The operation of the CPU unit is stopped. At this time, ERR/ALM LED on the front surface of the CPU unit is switched on. The position of memory error generation is stored at A40300-A40308. When the error is cleared, it becomes 0(OFF). | 1: error 0: normal |

Fig. 3

```xml
<ErrorGroup Name="CPU Error">
  <ErrorSubGroup Name="OperationStopError">
    <Error Name="MemoryError" ErrorCode="80F1" ErrorFlag="AR40115" Description="Generation of memory error of operation stop error">
      <ErrorControl Type="List Description=" Select from list memory error elements to be generated.>
        <ErrorAddress Address="AR40300" type = "Bit" AddToErrorCode="TRUE" Value="1" Description ="Program Check Sum Error"/>
        <ErrorAddress Address="400304" type = "Bit" AddToErrorCode="True" Value="2" Description = "PLC System Setup Check Sum Error"/>
        <ErrorAddress Address="40305" type = "Bit" AddToErrorCode="True" Value="3" Description = "IO Table Check Sum Error"/>
        <ErrorAddress Address="40306" type = "Bit" AddToErrorCode="True" Value="4" Description = "Routing Table Check Sum Error"/>
      <ErrorControl>
      </ErrorDetailPattern>
    </Error>
    <Error Name="IO Bus Error" ErrorCode="80C0" Address="AR40114" Description="Generation of IO bus error of operation stop error">
      <ErrorControl Type="Spin" "Input rack number and slot number corresponding to IO bus error to be generated.">
        <ErrorAddress Address="AR40400" type="Byte" AddToErrorCode="FALSE" Value="" Description="Rack No"/>
        <ErrorAddress Address="AR40408" type="Byte" AddToErrorCode="FALSE" Value="" Description="Slot No"/>
      </ErrorControl>
      </ErrorDetailPattern>
    </Error>
    ...
```

Fig. 4

| Variable | Value | | Description |
|---|---|---|---|
| ErrorGroup | Name | | Error category |
| ErrorSubGroup | Name | | Error subcategory |
| Error | Name | | Error name |
| | ErrorCode | | Error code |
| | ErrorFlag | | Shows which error flag is on when error is generated |
| | Description | | Explanation of error |
| ErrorDetailPattern | Type | | By what input method error detailed data are registered |
| | Module | | Capable of defining process routine additionally describing |
| ErrorControl | Type | | List/Spin/EditBox etc specifying data input control on error detailed screen |
| | Description | | Explanation of error |
| ErrorAddress | Address | | Corresponding address is switched on when this subcategory is selected |
| | Type | | Specifies in what units data are written in at address |
| | AddToErrorCode | | Whether value is added to ErrorCode. If TRUE, the value in VALUE is added to ErrorCode for display. |
| | | Value | Value to be added to ErrorCode when IddToErrorCode is TRUE |
| | | Description | Explanation |

Fig. 5

| Name | Error Detail Data | Generated Time | Cleared Time | Error Code | Error Status |
|---|---|---|---|---|---|
| MemoryError | Program CheckSumError | | | | |
| | PLCSystemSetup CheckSumError | | | | |
| | IOTable CheckSumError | 2007/03/16 12:21:34 | | 80F4 | Generated |
| | RoutingTable CheckSumError | | | | |
| I/OBusError | | 2007/03/16 12:25:04 | 2007/03/16 12:26:15 | 80C0 | Cleared |
| ........ | | ........ | ........ | | |

| <ErrorGroup> | <ErrorSubGroup> | <Error (Name)> | <Error (ErrorFlag)> | <Error_ErrorCode)> |
|---|---|---|---|---|
| CPU_Error | CPU_OperationStopError | Memory error | AR40115 | 80F1 |
| | | IO bus error | AR40114 | 80C0 |
| | | .. | | |
| | CPU_OperationContinuationError | Cycle time over | AR40108 | 809F |
| | | Basic IO error | AR40212 | 009A |
| | | Interrupt task error | AR40213 | 008B |
| | | .. | | |
| | | Battery error | AR40204 | 00F7 |

Fig. 11

| <ErrorGroup> | <ErrorSubGroup> | <Error (Name)> | <Error (ErrorFlag)> | <Error_ErrorCode)> |
|---|---|---|---|---|
| CPU_Error | CPU_OperationStopError | Memory error | AR40115 | 80F1 |
| | | IO bus error | AR40114 | 80C0 |
| | | .. | | |
| | CPU_OperationContinuationError | Cycle time over | AR40108 | 809F |
| | | Basic IO error | AR40212 | 009A |
| | | Interrupt task error | AR40213 | 008B |
| | | Duplication source error | AR31602 | 0003 |
| | | Communication duplication error | AR31603 | 0600 |
| | | .. | | |
| | | Battery error | AR40204 | 00F7 |

Fig. 13

```
<ErrorGroup Name="CPU Error" CPU="CJ1M-CPU63">
  <ErrorSubGroup Name="OperationStopError">
    <Error Name="MemoryError" ErrorCode="80F1" ErrorFlag="AR40115" Description="Generation of memory error of operation stop error">
    </Error>
    <Error Name="IO Bus Error" ErrorCode="80C0" Address="AR40114" Description="Generation of IO bus error of operation stop error">
    </Error>
    <Error Name="Cycle time over" ErrorCode="809F" Address="AR40108" Description="Generation of cycle time over of operation stop error">
    </Error>
     :
  </ErrorSubGroup>
  <ErrorSubGroup Name="OperationContinuationError">
    <Error Name="Basic IO error" ErrorCode="009A" ErrorFlag="AR40212" Description="Generation of basic IO error of operation continuation error">
    </Error>
    <Error Name="Interrupt task error" ErrorCode="008B" ErrorFlag="AR40213" Description="Generation of interrupt task error of operation continuation error">
    </Error>
     :
    <Error Name="Battery error" ErrorCode="00F7" ErrorFlag="AR40204" Description="Generation of battery error of operation continuation error">
    </Error>
  </ErrorSubGroup>
</ErrorGroup>
```

Fig. 12

```
<ErrorGroup Name="CPU Error" CPU="CS1D-CPU63">
    <ErrorSubGroup Name="OperationStopError">
        <Error Name="MemoryError" ErrorCode="80F1" ErrorFlag="AR40115" Description="Generation of memory error of operation stop error">
        </Error>
        <Error Name="IO Bus Error" ErrorCode="80C0" Address="AR40114" Description="Generation of IO bus error of operation stop error">
        </Error>
        ⋮
        <Error Name="Cycle time over" ErrorCode="809F" Address="AR40108" Description="Generation of cycle time over of operation stop error">
        </Error>
    </ErrorSubGroup>
    <ErrorSubGroup Name="OperationContinuationError">
        <Error Name="Basic IO error" ErrorCode="009A" ErrorFlag="AR40212" Description="Generation of basic IO error of operation continuation error">
        </Error>
        <Error Name="Interrupt task error" ErrorCode="008B" ErrorFlag="AR40213" Description="Generation of interrupt task error of operation continuation error">
        </Error>
        <Error Name="Duplication source error" ErrorCode="0003" ErrorFlag="AR31602" Description="Generation of duplication source error of operation continuation error">
        </Error>
        <Error Name="Communication duplication error" ErrorCode="0600" ErrorFlag="AR31603" Description="Generation of communication duplication error of operation continuation error">
        </Error>
        ⋮
        <Error Name="Battery error" ErrorCode="00F7" ErrorFlag="AR40204" Description="Generation of battery error of operation continuation error">
        </Error>
    </ErrorSubGroup>
</ErrorGroup>
```

Fig. 14

| <Error (Name)> | <ErrorControl (Type)> | <ErrorAddress (address)> | <ErrorAddress (Type)> | <ErrorAddress (AddToErrorCode)> | <ErrorAddress (Value)> | <ErrorAddress (Description)> |
|---|---|---|---|---|---|---|
| Memory Error | List Box (List) | AR40300 | Bit | TRUE | 1 | Program check sum error |
| | | AR40304 | Bit | TRUE | 2 | PLC system setup check sum error |
| | | AR40305 | Bit | TRUE | 3 | IO Table check sum error |
| | | AR40306 | Bit | TRUE | 4 | Routing table check sum error |
| IO Bus Error | Spin Control (Spin) | AR40400 | Byte | FALSE | ... | Rack No |
| | | AR40408 | Byte | FALSE | ... | Slot No |

Fig. 15

SIMULATION DEVICE FOR PROGRAMMABLE CONTROLLER

This application claims priority on Japanese Patent Application 2007-120295 filed Apr. 27, 2007.

BACKGROUND OF THE INVENTION

This invention relates to a simulation device for a programmable controller (hereinafter referred to as PLC).

As one of general PLC functions, a PLC is comprised of a memory for recording the occurrences of errors caused by hardware or in communication. The conditions of presence and absence of the occurrence of an error are shown by a bit in most situations, "0" indicating no occurrence of an error and "1" indicating the presence of an error.

A program created by the user for a PLC to carry out (called the user program) is usually adapted to detect the occurrence of such errors in the PLC and to describe processes corresponding to them (referred to as the error processes). If these error processes are not being described, the system may not stop correctly after it is operated or may fail to detect the occurrence of an error in an unlikely situation where an error has occurred in the PLC and there may be a serious effect on the system.

FIG. 28 shows an example of a user program for detecting the occurrence of an error in an ordinary PLC. AR402.12 (basic IP error), AR402.08 (inner board error), AR402.07 (CPU high-performance unit error) and AR402.06 (high-performance 10 unit error) are addresses in the memory for recording the occurrence of errors. When a flag corresponding to such an address is ON, it is detected as a hardware error in a CPU unit capable of continued operation and an error process is carried out.

The memory for recording such occurrence of errors is usually made as a read-only memory in order to prevent the user program from being erroneously written over. In such a situation, it is necessary to artificially generate an error in order to ascertain that the error process is functioning correctly.

The most primitive way of artificially generating an error is to physically create a condition for generating an actual error. In such a case, a unit may be removed or a communication cable may be pulled out for the purpose of attempting to artificially generate an error. Since there are errors that would not occur unless there is a hardware error, however, it is difficult to artificially generate errors of all kinds.

Another method is to carry out a debugging process by imbedding a special command for artificially generating an error (or an error generating command) and causing an error artificially as this error generating command is executed. FIG. 29 shows an example of user program for artificially generating an error. A program including a special command for artificially generating an error (the FAL command in the example of FIG. 29) is created and used for debugging. This method, however, is cumbersome to carry out because a program for generating an error must be created. Moreover, this error generating command must be eliminated at the time of carrying out the real program, and an unexpected error may result if it is neglected to do so.

The simulation function for carrying out the debugging of the PLC on a personal computer has been known but since the same operation characteristics as on a real device are being realized and the memory for recording the aforementioned error generation is in the read-only condition, it cannot be done to realize the error condition by simulation.

Another problem with the debugging of errors of a PLC relates to missed descriptions of error processes. According to a manual, flags for showing various kinds of errors and the conditions of the PLC are in the memory for recording occurrences of errors but since there are many kinds of data, it is difficult to understand which flags in a system should be handled in what way. Especially since the number of flags to be handled as errors is increasing as the product type or the version is changed, missed descriptions of error processes tend to occur, causing a big problem at the time of the system operation. In the past, attempts were being made to simplify the manuals as much as possible but this has not been a dependable way to prevent missed error descriptions.

As shown, for example, in Japanese Patent Publication Tokkai 2004-258926, simulation devices for programs of a programmable controller for inspecting a program without connecting a PLC and an external apparatus have been known.

SUMMARY OF THE INVENTION

As described above, methods of physically generating an actual error condition or incorporating a dedicated error generating command in a user program to change the detail of a flag assigned to a specified address in the memory for recording error generations to another value corresponding to an error for the purpose of inspecting the operation of a user program but the former can be applied to only a few kinds of error and cannot be used generally for a wide variety of errors, while the latter allows the details of the target flags to be virtually changed to the value equivalent to an error but may cause an unexpected situation during the operation if the user neglects to remove this dedicated error generating command from the user program.

Even if such a dedicated error generating command is usable, ordinary memories for recording generation of errors in a PLC contain an extremely large number of flags. Moreover, a table like a memory map offered in an operation manual will have to be consulted for correctly understanding the meaning of each flag. Thus, it has been likely for a user not understanding the meaning of the flags sufficiently to forget to incorporate a command to consult an appropriate flag at the time of creating a user program or to incorporate a command to reference an incorrect flag and hence that the system could not be adequately protected at the time of occurrence of an error.

It is therefore an object of this invention in view of these problems to provide a simulation device for a PLC capable of making it easier to understand the specifications of flags corresponding to various errors for each of different types of PLC and changing the logical value of a desired flag to another value corresponding to an error by a simple operation without the necessity of incorporating any dedicated error generating logic in the user program such as in the situation where a dedicated error generating command is employed such that there will not occur unexpected erroneous operations caused because it is forgotten to remove the dedicated logic for error generation at the time of switching from the debugging mode to the operation mode.

Other objects and merits of the present invention will become clear to any person skilled in the art by referencing the description that follows.

The technological problems described above are properly addressed to by a simulation device for a PLC structured as described below.

A simulation device for a programmable controller according to this invention is characterized as being formed by realizing by software on a computer a virtual PLC for emulating operations of a real PLC, a tool that functions as a development aid device for the virtual PLC and an error simulator for emulating an error that occurs in the virtual PLC.

In the above, the virtual PLC comprises a virtual communication unit for providing a virtual communication function with the tool, a PLC type data memory for storing type data of PLC to be emulated which are received from the tool through the virtual communication unit, a PLC simulation engine for emulating operations of PLC of a type corresponding to PLC type data stored in the PLC type data memory, a PLC virtual memory comprising a user memory for storing a user program which is carried out by the PLC simulation engine, an error memory for storing error data individually for each of error items, the error data indicating presence and absence of occurrence of various error items inclusive of hardware errors and communication errors occurring in the PLC, and an input-output memory for storing input-output data, and a simulation engine interface for providing a function of allowing an access from the error simulator to the virtual PLC without passing through the virtual communication unit.

In the above, furthermore, the error simulator comprises a PLC error data memory by type for storing PLC error data inclusive at least of the relationship between error items that can be generated in the PLC and addresses in the error memory in the virtual PLC storing data on presence and absence of error generation related to the error items, a type data taking part for taking in PLC type data from the PLC type data memory through the simulation engine interface, a type dependent data taking part for taking in, from the error data memory by type, PLC type data of a type corresponding to the type data taken in through the type data taking part, a display part for causing a user to select an error item and to specify presence and absence of error generation of the error item by making a list display, on a screen of the computer, of the error items comprising PLC error items taken in through the type dependent data taking part, and a simulator PLC writing part for writing in data corresponding to the specification of presence and absence of error generation at a corresponding address in the error memory of the virtual PLC through the simulation engine interface when the selection of the error items and the specification of presence and absence of error generation are carried out by specified user operations.

Being thus structured, the simulation device of this invention is adapted to function so as to set, without any operations by the tool, a specified condition at a corresponding address in the error memory of the virtual PLC by carrying out a specified error selection operation and a specified operation regarding presence and absence of error generation, based on a list display of error items on the computer screen, after causing desired PLC type data to be stored in the PLC type memory in the virtual PLC through the tool.

As a result, the present invention makes it possible to easily understand the specification of the error memory of a PLC and to vary the logical value of a desired error bit into an equivalent value by a simple operation without incorporating any dedicated logic for generating errors into a ladder program as in the case of using a dedicated command for generating an error. Thus, this invention has the merit in that there is no danger of unexpected erroneous operations caused by neglecting the restoring process when it is switched back from the debug mode to the operating mode.

In the description of the invention above, the display part of the error simulator may be adapted to serve to display, as a list on the screen of the computer, the relationship between error items and addresses of the error memory such that those of the error items selected and not selected by the user and the specified condition of presence and absence of error generation become visually distinguishable.

With the display part thus structured, since it becomes easier to understand and to visually distinguish between those of the error items selected and not selected by the user and the condition of presence and absence of the specified error generation, erroneous operations such as neglecting to clear the selection of an error item or specification of presence and absence of error generation becomes unlikely to occur.

In the description of the invention above, the PLC error data memory by type of the error simulator may be adapted to store not only the relationship between the error items and the addresses in the error memory but also text data showing contents of meaning of each of error items, and the display part of the error simulator may be adapted to serve to display, as a list on the screen of the computer, also the error items inclusive of sentences indicative of the contents of meaning of the error items, based on the text data.

With such a structure, since explanatory sentences are added in addition to a simple list display of error items, the user can easily select optimum error items out of many error items.

In the description of the invention above, furthermore, the PLC error data memory by type of the error simulator may be adapted to store a plurality of error items generated in individual PLC types inclusive of hierarchical structure, and the display part of the error simulator may be adapted to display the error items, as a list on the screen of the computer, in a display format that clearly shows the hierarchical structure.

With such a structure, since the error items are displayed as a list in a display format that makes the hierarchical structure clearer, even the hierarchical relationship among a plurality of error items in an organic structure can be easily understood.

In summary, the present invention makes it possible to easily understand the specification of an error memory provided by a PLC, and since the logical value of a desired error bit can be changed to an equivalent value by a simple operation without incorporating any dedicated logic for error generation in the ladder diagram program, the danger of causing an unexpected error by neglecting to carry out a restoration when switching back from the debugging mode to the operation mode can be eliminated.

BRIEF DESCRIPTION OF THE DRAWINGS

FIG. 3 shows as a list a portion of the content of an error memory.

FIG. 4 is an example displaying a portion of the PLC error data by types in the XML format.

FIG. 5 is an example explaining the items in the case of displaying the PLC error data by types in the XML format.

FIG. 6 is a drawing that shows the content of the error history table.

FIG. 7 is a drawing that shows an example of error simulation screen image.

FIG. 11 shows an example of error list screen image.

FIG. 12 shows an XML file showing an example of PLC error data by types describing an error list.

FIG. 13 shows another example of error list screen image.

FIG. 14 shows another XML file showing another example of PLC error data by types describing an error list.

FIG. 15 shows an example of error detail setup.

DETAILED DESCRIPTION OF THE INVENTION

A preferred example of simulation device for a PLC embodying this invention will be described next with reference to the drawings.

Figure 1:
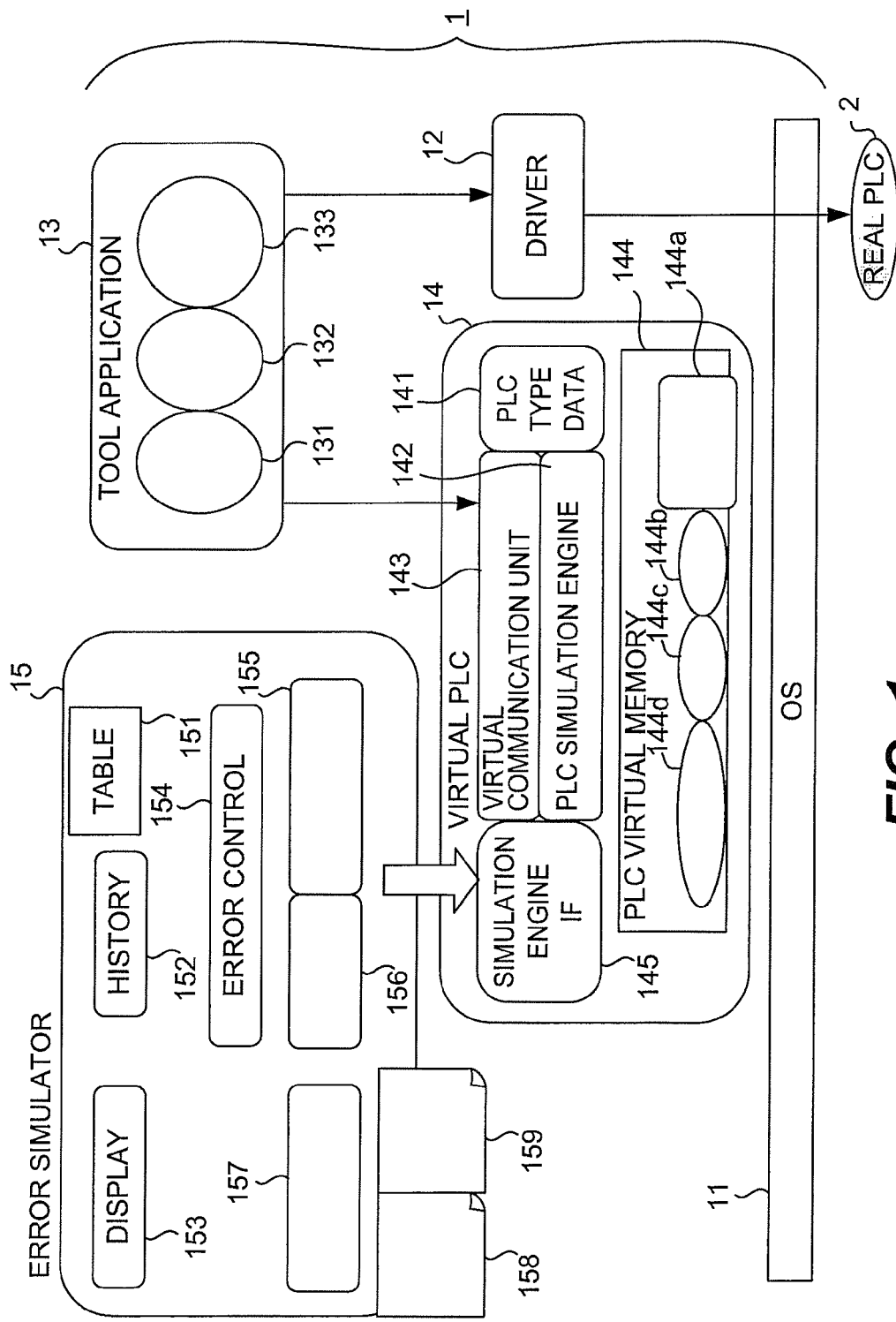
FIG. 1 is a diagram showing the functional structure of a simulation device for a PLC embodying this invention.

FIG. 1 shows the system structure of a simulation device 1 according to this invention. As shown, this simulation device 1 for a PLC comprises an operating system (OS) 11, a communication driver 12, a tool application 13, a virtual PLC 14 and an error simulator 15.

The tool application 13 is formed, containing a design tool 131 for the PLC, a displayer design tool 132 and a user application 133 for monitoring and controlling the PLC.

The virtual PLC 14 is for providing the function for emulating a real PLC 2 on the PC, as is well known by persons skilled in the art, and includes PLC type data 141, a PLC simulation engine 142, a virtual communication unit 143, a PLC virtual memory 144, and a simulation engine interface (simulation engine IF) 145.

The virtual communication unit 143 is a functional module that provides a communication unit virtually to the virtual PLC 14 and an interface similar to a real device to an access from a tool in the tool application 13 and the user application. The simulation engine interface 145 is for providing an interface for accessing the virtual PLC unit directly, not through the virtual communication unit, when accessing the virtual PLC 14.

The error simulator 15 is for providing the function of providing and issuing error data as a list, as will be explained in detail below. The error simulator 15 includes an error history table 151, an error history part 152, a display part 153, an error control part 154, and simulator PLC writing part 155, a type data taking part 156 and type dependent data taking part 157, PLC error data by types 158 and user-defined error data 159.

In the above, the PLC error data by types 158 are the errors for each of PLC types and a structure text describing the corresponding addresses and display methods. The real PLC 2 means the actual device of the PLC.

Figure 2:
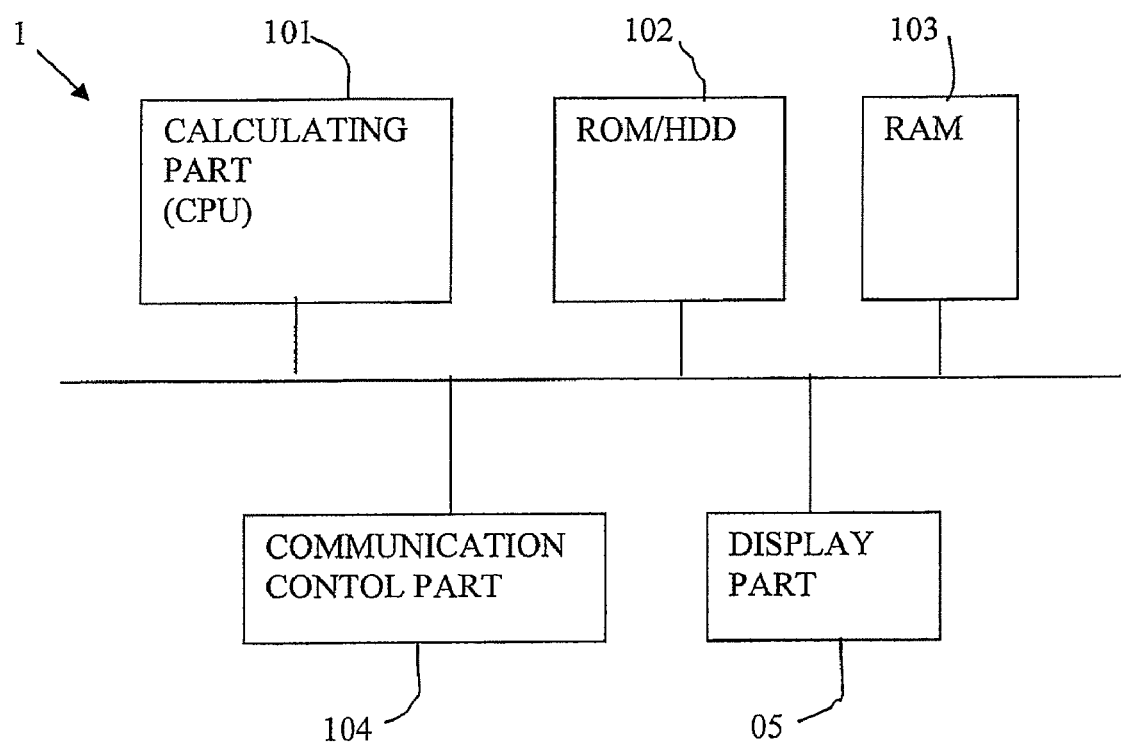
FIG. 2 is a diagram showing the hardware structure of the simulation device for a PLC embodying this invention.

The simulation device 1 with the functional structure shown above in FIG. 1 is operated on a personal computer (PC) having a hardware structure shown in FIG. 2, including a calculating part 101 for controlling the execution of software including the OS 11. A ROM or a HDD 102 contains a module for executing the software. A RAM 103 is used for supporting a work area (such as virtual PLC and error memory) required for executing the software. A communication control part 104 is used for the control of communications with external apparatus such as the PLC. Displays to the user are made through a display part 105. The above is the same as the hardware structure of an ordinary PC.

Next, the operations of the simulation device 1 with the functional structure shown in FIG. 1 are explained sequentially as follows:

(1) The design tool 131 for the PLC connects to the virtual PLC 14 according to the PLC type specified by the user. The data on this PLC type are transmitted to the PLC simulation engine 142 through the virtual communication unit 143 of the virtual PLC 14 and stored in the PLC type data 141. Thus, the virtual PLC 14 comes to simulate a PLC of the type specified by the user inside the personal computer.

IS (2) The type data of the PLC simulated by the virtual PLC 14 are obtained with the error simulator 15 connecting to the virtual PLC 14.

(3) Error list data corresponding to the type are obtained through the type dependent data taking part 157 from the PLC error data by types 158 corresponding to the received type data.

(4) A list of the errors generated in the corresponding type is displayed through character and figure data to the user on the display part 153 based on the error list data.

(5) The error to be generated is determined according to the user's choice. A plurality of errors may be selected at the same time.

(6) The selected error is issued to the simulation engine interface 145 of the virtual PLC 14.

(7) The simulation engine interface 145 describes the error data to the error memory 144d for storing errors for the specified PLC 14. This simulation engine interface 145 can freely update the memory areas (144b, 144c and 144d) of the virtual PLC 14, unlike the access from the virtual communication unit 143. Thus, the error simulator 15 can change the value of the error memory 144d, which is dedicated to the reading-in for the access from the tool application 13.

(8) The user program carries out the error process, with an error written in the error memory. The tool application 13 also carries out a process corresponding to the error generated in the virtual PLC 14.

(9) The error simulator updates the character and figure data such that it can be understood which error has been generated.

(10) The user can clear the generated error by means of the error simulator 15.

(11) The user selects to determine which generated error to be cleared. A plurality of errors may selected at the same time.

(12) The selected cleared error is issued to the simulation engine interface 145 of the virtual PLC 14.

(13) The simulation engine interface 145 describes data on clearing of error for the error memory 144d storing the error of the specified virtual PLC.

(14) The user program carries out the error clear process as the error clear is written in the error memory 144d. The tool application 13 also carries out a process corresponding to the error clear of the virtual PLC 14.

The following operational effects are obtained by the simulation device 1 for the PLC structured as explained above:

(1) Errors can be displayed as a list. Thus, the user can easily understand from a manual regarding which error a process should be described, and hence a missing description of error process can be eliminated. Error processes can be recognized without a failure by generating them actually from the error list.

(2) There is no need to design or debug a program for debugging which is for generating errors. Since the process for removing this program from debugging also becomes unnecessary at the time of the operating, the error by failure to remove can be prevented.

(3) It is possible to describe which of the errors has been recognized by changing the character colors, background color or the figure in the error list regarding those for which an error has been generated or cleared from the error list.

Next, the operations of the simulation device 1 for the PLC explained above with reference to FIGS. 1 and 2 will be described more in detail.

There will firstly be explained the changes in the condition of the flag corresponding to an error memory when an error has occurred. FIG. 3 shows in the form of a list a portion of the content of the error memory.

(1) As shown, as an error occurs in the PLC system, the flag for the presence of an error is switched ON. In the case of the illustrated example, it is a memory error and address A40115 becomes ON.

(2) As an error occurs in the PLC system, an error code is written in the error content reporting area. In the case of the illustrated example, a code showing the error content is described in the error code storage area A400.

(3) The error memory has an area for each error for storing detailed data on the error, if necessary. In the case of the memory error described above, for example, it becomes clear what kind of memory error it was according to the contents of A40300-A40308.

Next, the user program of the PLC and the tool application 13 detect changes in these areas described above if an error has occurred and describe the process for the error. It is checked at the time of debugging whether these processes are correctly operated.

FIG. 4 shows an example displaying a portion of the PLC error data by types 158 in the XML format. FIG. 5 shows an example of explaining the items in the case of displaying in the XML format. As shown, a list describing such error data for each type of PLC is prepared. Although the description is in the XML format in this example, any format may be used such as the relational database format or the format with data connected by punctuation marks.

FIG. 6 shows the content of the error history table 151. As shown, the error history table 151 describes a list of errors that can be generated in the form of a list and is created by reading in the PLC error data by types 158 (as shown in FIG. 1). This table includes data such as the date and the time when the error was generated (generated time), the date and the time when the generation was cleared (cleared time), the error code, the current error status (no error generated, condition of having generated an error and condition of having cleared a generated error).

In the case of the example shown in FIG. 6, an error was generated at 12:21:34 on Mar. 12, 2007 (Mar. 16, 2007) regarding "IOTableCheckSumError" of the memory error. It can also been seen that "IOBusError" was generated at 12:25:04 on Mar. 16, 2007 and cleared at 12:26:15 on Mar. 16, 2007. Their error status is respectively shown as "Generated" and "Cleared".

Figure 7:
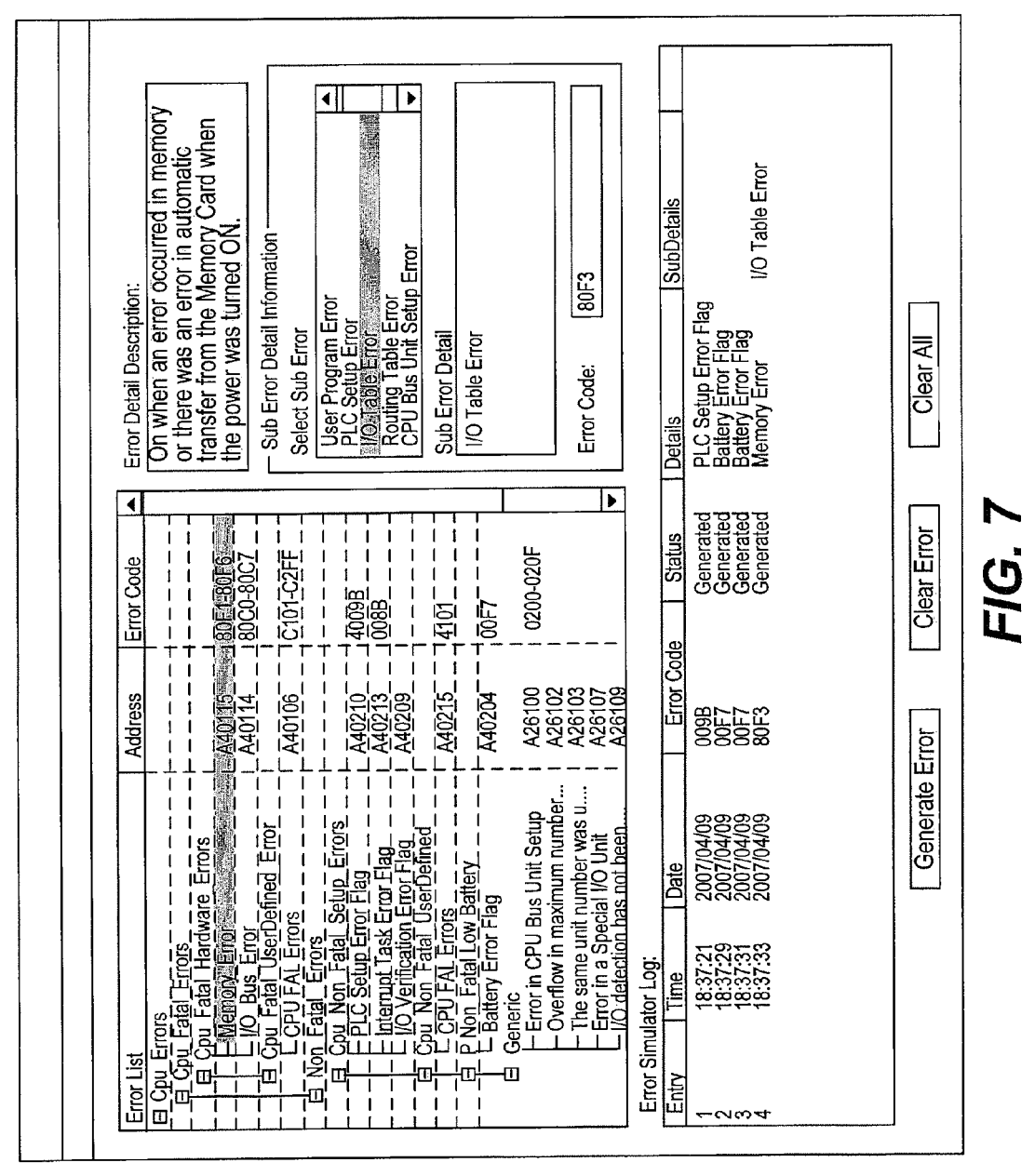
Figure 20:
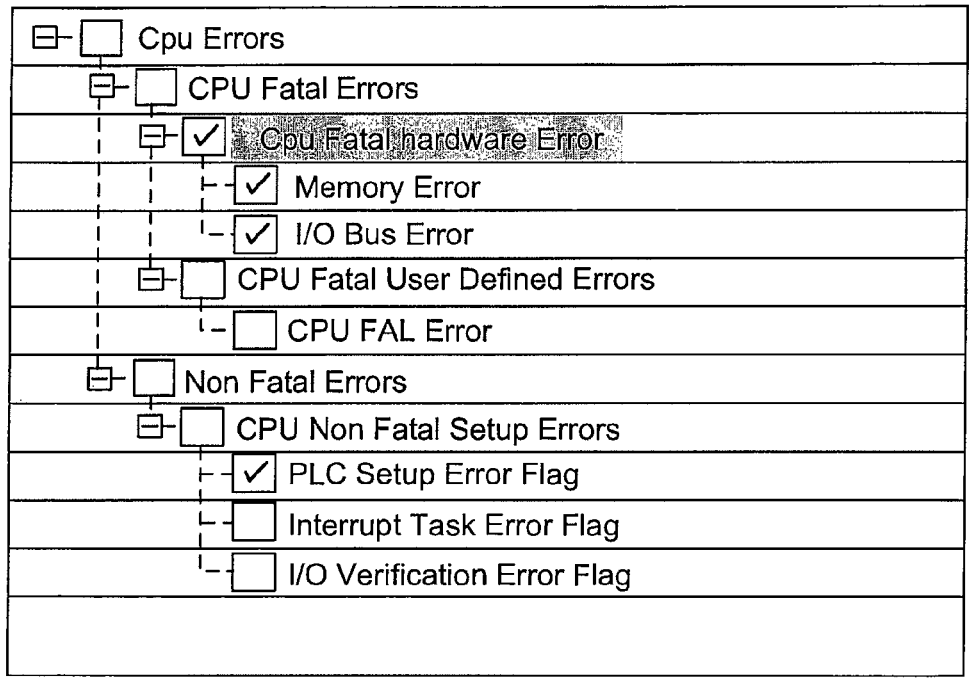
FIG. 20 shows a display image of error generation and clearing on the error simulation screen.

The best use of this table can be made of if those of the errors that have been generated, those that have been generated and cleared, and those that have not been generated are displayed in different colors within the error list. FIG. 20 shows a display image of error generation and clearing on the error simulation screen. This information can be put to a practical use as a record of error test execution if it is stored as a file. FIG. 7 shows an example of error simulation screen image. Generated errors can be cleared summarily by clearing all errors having "Generated" as the error status by pressing the ClearAll button shown in FIG. 7.

Figure 8:
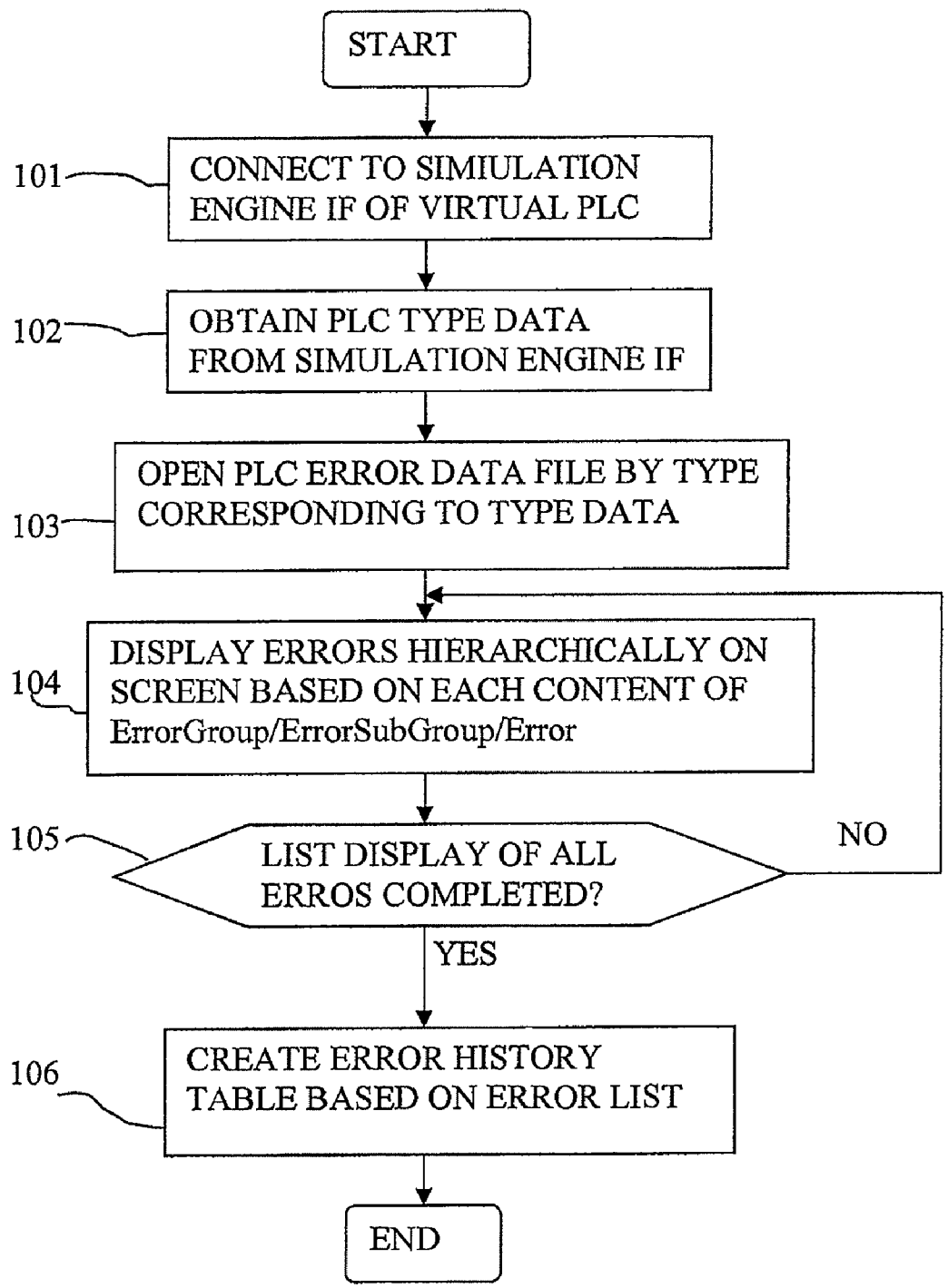
FIG. 8 is a flowchart that shows the error simulation list display process.

FIG. 8 is a flowchart showing the error simulation list display process. As this process is started, the error simulation part connects to simulation engine interface of the virtual PLC (Step 101) and then obtains the type data of the PLC from the simulation engine interface (Step 102). In the above, the device type is set when the tool contained in the tool application 13 or the user application comes to be connected to the virtual PLC.

Next, the PLC error data file by type corresponding to the type data is opened (Step 103) and the errors are displayed hierarchically based on each of the contents ErrorGroup/ErrorSubGroup/Error (Step 104). If the list display on all of the errors has not been completed (NO in Step 105), the process returns to Step 104 to repeat the hierarchical display of the errors. If the list display on all of the errors has been completed (YES in Step 105), an error history table is created on the basis of the error list which has been read in, and it is set that the error has not been generated (Step 106). In the above, to set that the error has not been generated means that the columns for the generated time, the cleared time, the error code and the error status are all left in blank.

This is how the error simulator 15 is connected to the simulation engine interface 145 of the virtual PLC 14. The method of communication with the PLC simulation engine 142 may be the command communication method whereby a command is transmitted from the error simulator 15 to the PLC simulation engine interface 145 to carry out the communication, the common memory method whereby data are written in a common memory so as to be possessed in common, or any other method. The memory of the virtual PLC 14 may be directly opened as the common memory. In such a case, it is not necessary for the simulation engine interface 145 to carry out any particular process, and the error content reflected by the error simulator 15 to the common memory is directly reflected to the virtual PLC memory.

Figure 9:
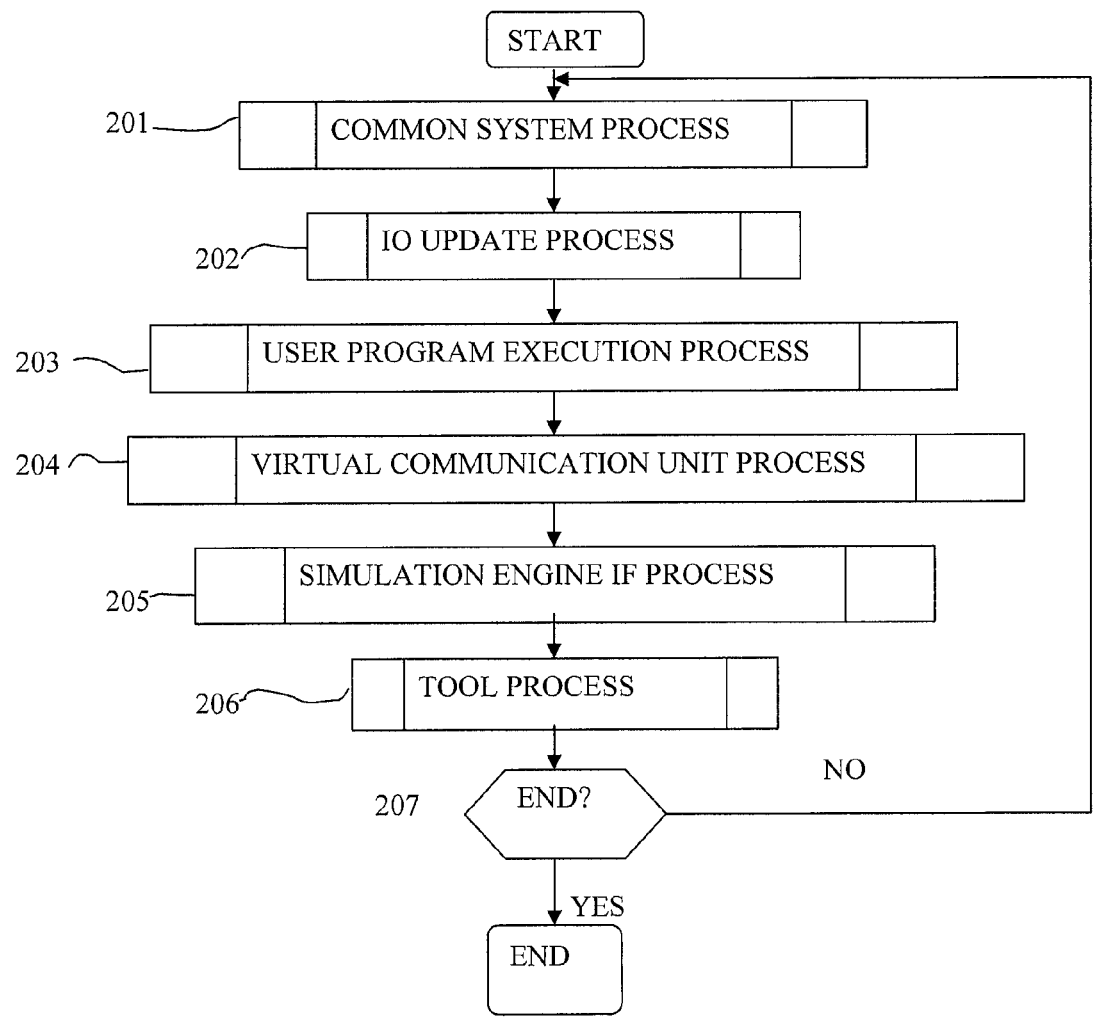
FIG. 9 is a general flowchart that shows an outline of the process by the virtual PLC.
Figure 10:
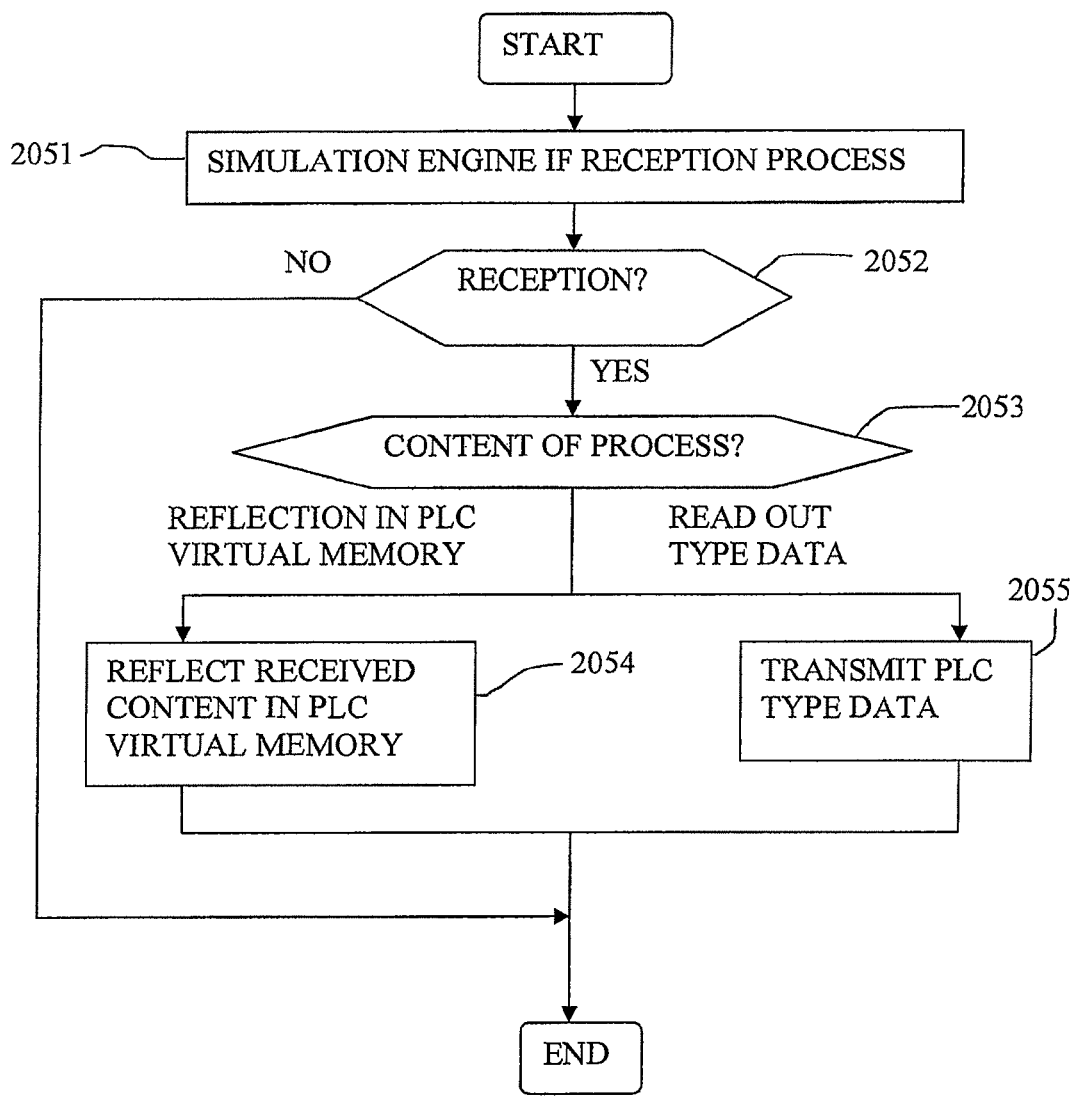
FIG. 10 is a flowchart that shows the details of the process by the simulation engine interface.

FIG. 9 is a general flowchart that shows an outline of the process by the virtual PLC, and FIG. 10 is a flowchart that shows the details of the process by the simulation engine interface. The description will be on the basis of an example by the command communication method. As this process is started, the common system process is initially carried out (Step 201), followed sequentially by the 10 update process (Step 202), the user program execution process (Step 203), the virtual communication unit process (Step 204), the simulation engine interface process (Step 205), and the tool process (Step 206). When these processes are continued (NO in Step 207), the processes of Steps 201-207 are similarly repeated. If they are completed (YES in Step 207), the processes shown in the chart are terminated.

Next, the simulation interface process in Step 205 of FIG. 9 will be explained in detail with reference to FIG. 10. As this simulation engine interface process is started, the simulation engine interface reception process of the common memory is carried out first (Step 2051). If the reception process is carried out (YES in Step 2052), the content of the process is determined (Step 2053). If it is the PLC virtual memory reflection, the received content is reflected in the PLC virtual memory (Step 2054) and the process is terminated. If the content of the process is the type data read-out, the PLC type data are transmitted (Step 2055) and the process is terminated. In the case of no reception in Step 2052, the process is directly terminated.

Thus, the error simulator 15 requests the simulation engine interface 145 of the virtual PLC 14 to obtain the type data. As the process by the simulation engine interface 145, the virtual PLC 14 receives the call-out process of the PLC type data and returns the type data (such as "CJ1M-CPU63") stored in the PLC type data area of the virtual PLC 14 to the error simulator 15.

Based on the type data obtained from the simulation engine interface 145, the error simulator 15 obtains the error list data corresponding to the type data from the PLC error data by types 158 and reads in its described content. For example, the PLC error data by types 158 may be comprised of a plurality of files with names including the type data assigned as their file names and each file being arranged to preliminarily store the error list data of the type corresponding to the type data included in its file name. With the PLC error data by types 158 thus formed, the error simulator 15 refers to the file with the file name corresponding to the type data from the PLC error data by types 158. If such a file corresponding to the type data is present, it is possible to obtain the desired error list data by reading out its contents. Alternatively, the PLC error data by types 158 may be formed by means of a relational database (RDB) such that reference may be made with the type data as the key to obtain the error list data of the desired type.

FIG. 11 shows an example of error list screen image, and FIG. 12 shows an XML file showing an example of PLC error data by types describing an error list.

According to one method of description, there are a plurality of <ErrorSubGroup>'s within a single <ErrorGroup>, a plurality of <Error>'s being within a <ErrorSubGroup>. If the example of the error list in FIG. 11 is displayed in the PLC error data file by types, it becomes as shown in FIG. 12. In this example, descriptions of detailed data on each error (such as memory error) are omitted in order to make it easier to understand. A list of errors can be displayed as shown in FIG. 11 by reading in this PLC error data file by types. In other words, a list of errors as shown in FIG. 7 is displayed.

FIG. 13 shows another example of error list screen image, and FIG. 14 shows another XML file showing another example of PLC error data by types describing an error list. Since CS ID is a type corresponding to duplication, errors in duplication are added to the errors for CJ1M. Thus, a different error list can be displayed by reading in the PLC error data file corresponding to it (shown in FIG. 14).

If an error is selected on the screen shown in FIG. 7, detailed data of the error are displayed. FIG. 4 is an example describing the PLC error data file shown in FIG. 12 including the details of the errors. In FIG. 7, the details of the memory error are described as ErrorDetailPattern data.

FIG. 15 shows an example of error detail setup. This shows an example of detail data for a memory error within the error list. The PLC error frequently requires additional data for determining its cause, depending on the type of the error.

In the case of a memory error, for example, it is necessary to know where in the memory of the PLC the memory error was generated. In the case of an IP bus error, the user would like to know in which rack and slot the error was generated. Since the methods of registering error data differ for each type, it is so arranged that the procedure for registering the error data at this time can be registered by the PLC error data file by types.

FIG. 4 shows, for example, that list boxes for displaying memory errors are used. Items that are selectable as this list include "Program check sum error", "PLC system setup check sum error", "I/O Table check sum error", "Routing table check sum error", etc., and the flag shown by the address corresponding to the selected list, such as the address of AR40300 in the case of "Program check sum error", is switched ON.

Figure 16:
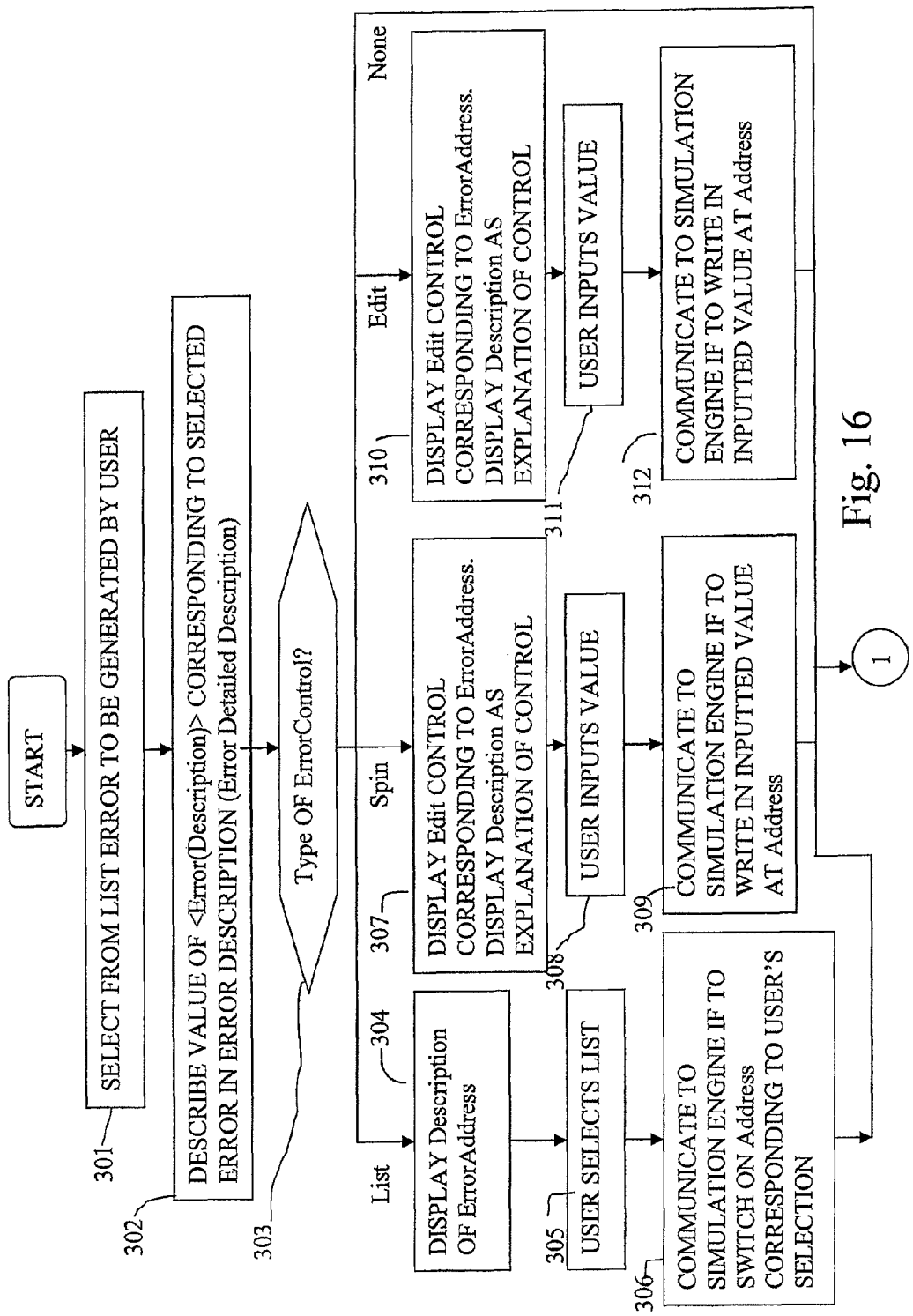
FIGS. 16 and 17 are a flowchart showing the error generation process in the error simulation.
Figure 17:
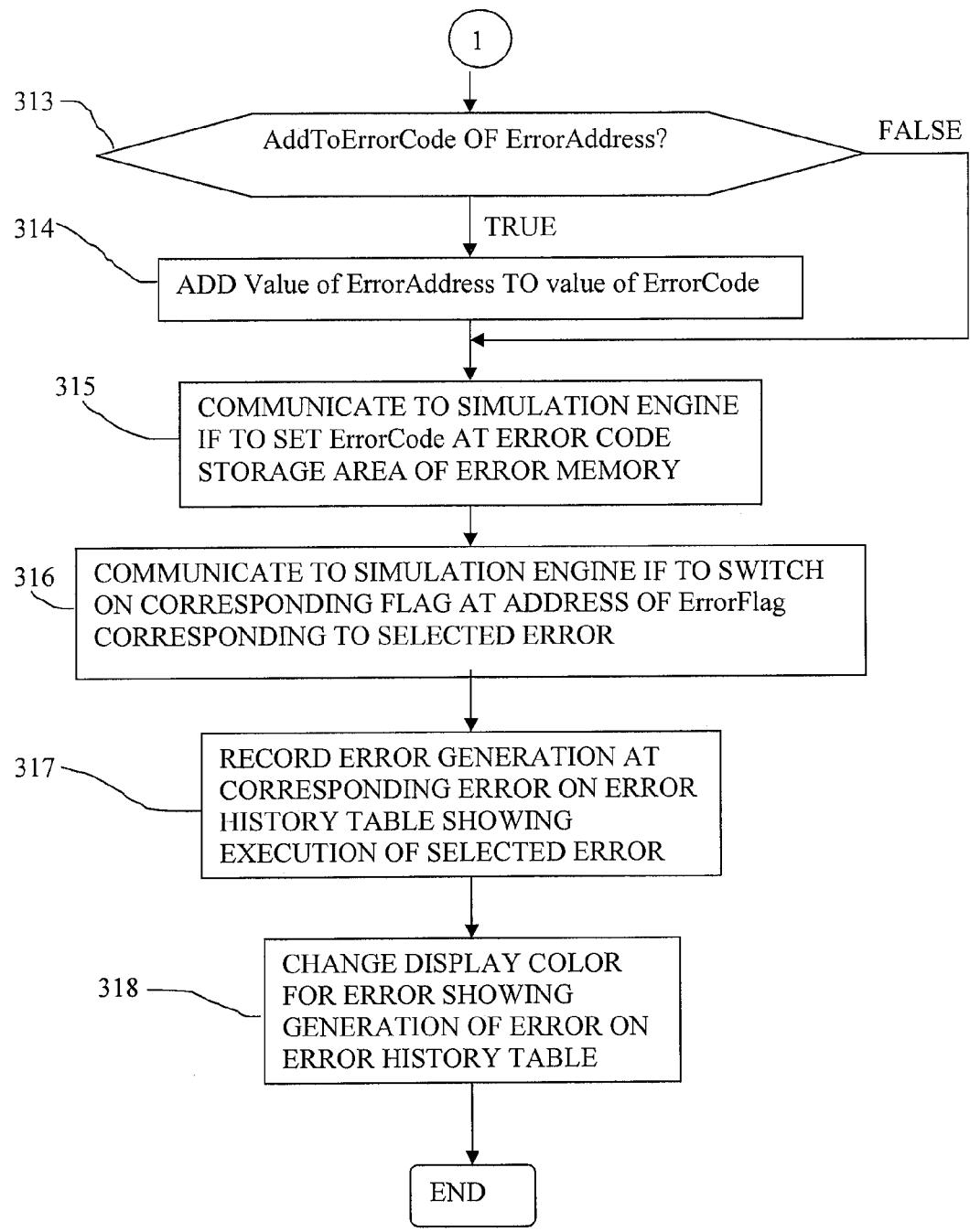

FIGS. 16 and 17 are a flowchart showing the error generation process in the error simulation, and FIG. 20 shows an image of error generation and clearing on the error simulation screen. As this process is started, the user selects the error to be generated from the list (Step 301), and the value of <Error (Description)> corresponding to the selected error is described in the error description (Error Detailed Description) (Step 302). Next, the type of ErrorControl is determined (Step 303), and if it is List, the Description of ErrorAddress is displayed as the selection branches of List (Step 304) to cause the user to select a list (Step 305) and a communication is made to the simulation engine interface so as to switch ON the flag corresponding to the address selected by the user (Step 306). If the selected type is Spin, the corresponding Spin control is displayed in ErrorAddress, and Description is also displayed as the explanation of the Spin control (Step 307). Next, the user is caused to input a value (Step 308), and a communication is made to the simulation engine interface to write the value inputted by the Spin control in the address (Step 309). If the selected type is Edit, the corresponding Edit control is displayed in ErrorAddress, and Description is also displayed as the explanation of the Edit control (Step 310). Next, the user is caused to input a value (Step 311), and a communication is made to the simulation engine interface to write the value inputted by the Edit control in the address (Step 312).

After the communication to the simulation engine interface in Step 306, 309 or 312 is completed, the determination of AddToErrorCode of ErrorAddress is carried out (Step 313). If the result is TRUE, Value of ErrorAddress is added to the value of ErrorCode (Step 314). If it is FALSE, this addition is not carried out before proceeding to the next step.

Next, a communication is made to the simulation engine interface to set ErrorCode in the error code storage area of the error memory (Step 315) and to switch ON the flag corresponding to the address of ErrorFlag corresponding to the selected error (Step 316). Next, the error generation at a corresponding error in the error history table indicating the execution of the selected error (Step 317) and the process of FIGS. 16 and 17 is concluded after the color of display in the error history table is changed for the error for which the generation has been recorded (Step 318), say, by recording "Generated" in the column for error status of FIG. 6.

Figure 18:
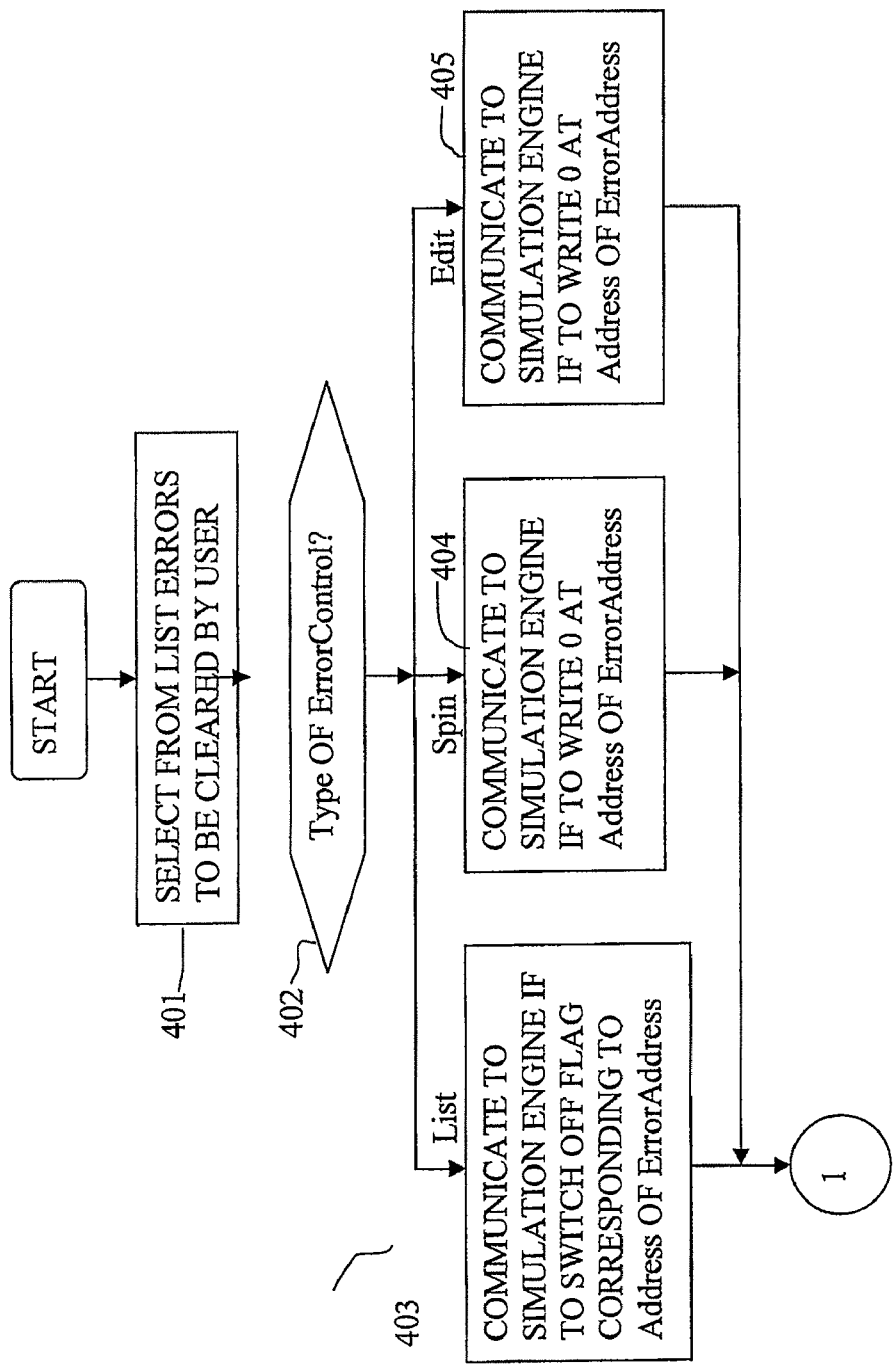
FIGS. 18 and 19 are a flowchart showing the error clearing process in the error simulation.
Figure 19:
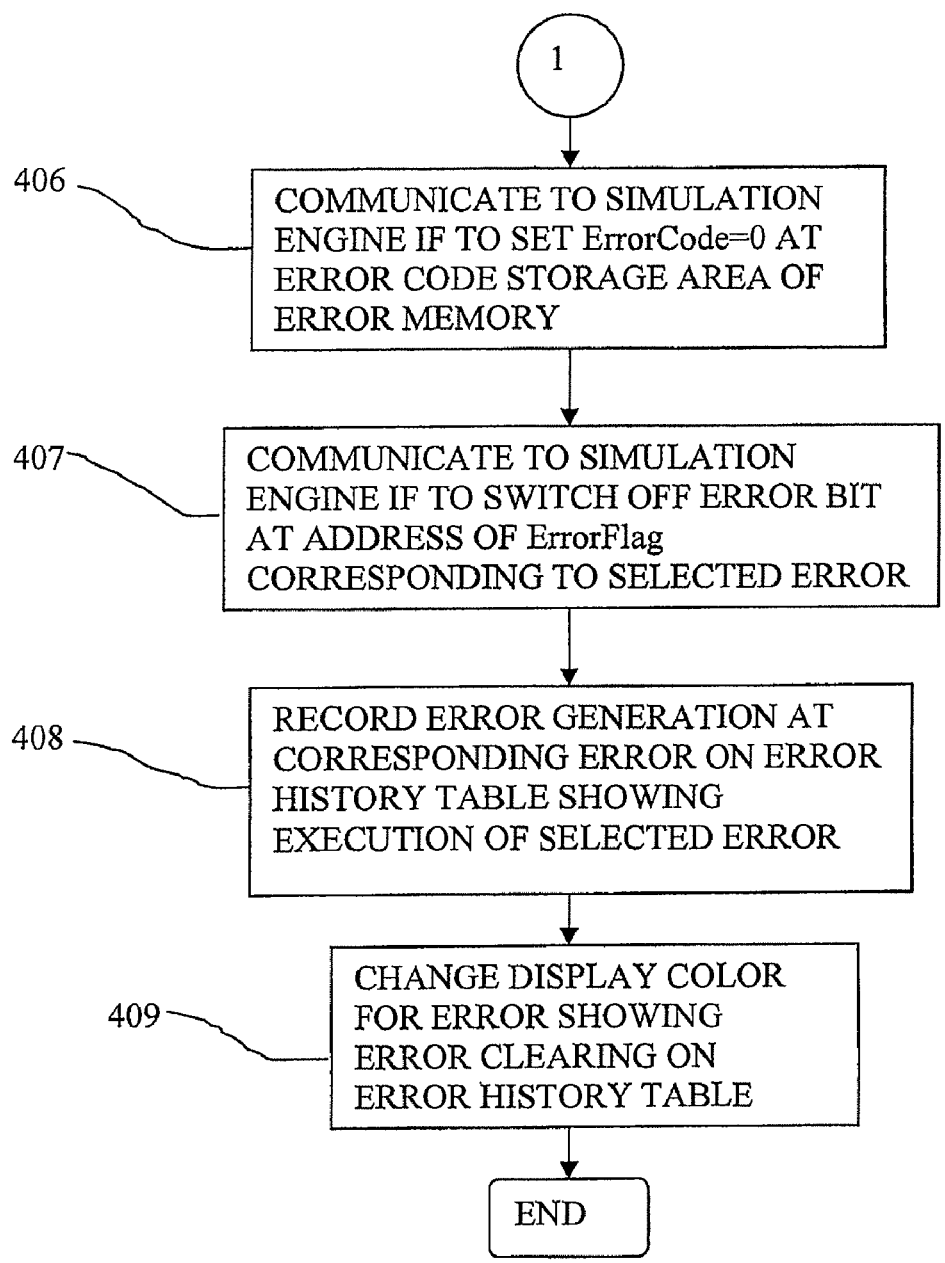

FIGS. 18 and 19 are a flowchart showing the error clearing process in the error simulation. The process starts by causing the user to select from the list an error to be cleared (Step 401) and the type of ErrorControl is determined next (Step 402). If the selected type is List, A communication is made to the simulation engine interface to set OFF the flag at the corresponding address in ErrorAddress (Step 403). If the selected type is Spin, a communication is made to the simulation engine interface to write 0 in the address in ErrorAddress (Step 404). If the selected type is Edit, a communication is made to the simulation engine interface to write 0 in the address in ErrorAddress (Step 405).

After the communication to the simulation engine interface in Step 403, 404 or 405 is completed, a communication is made to the simulation engine interface to set ErrorCode=0 in the error code storage area of the error memory (Step 406) and to switch OFF the flag corresponding to the address of Error-Flag corresponding to the selected error (Step 407). Next, the error cleared is recorded at the corresponding error of the error history table for showing the clearing of the selected error (Step 408) and the process of FIGS. 18 and 19 is concluded after the color of display in the error history table is changed for the error for which the clearing has been recorded (Step 409), say, by recording "Cleared" in the column for error status of FIG. 6.

Thus, if the user selects a memory error from the error list, this information is displayed in the column of Error Detail Description of FIG. 7 since Description of <Error> in FIG. 12 is "memory error generation of OperationStopError".

Since Type of <ErrorControl> corresponding to "memory error" is List according to FIGS. 4 and 15, the list control is set in Sub Error Detail Information of FIG. 7.

As entries to the list, furthermore, "Program check sum error", "PLC system setup check sum error", "I/O Table check sum error", "Routing table check sum error", etc. described in Description of <ErrorAddress> corresponding to "memory error" of FIG. 4 are displayed to be selected by the user. After the selection is made from the list, the user selects "Generate Error", etc. of FIG. 7 to specify the generation of an error.

The error simulator requests the simulation engine interface of the virtual PLC to switch ON the address AR40305 set at Address of <ErrorAddress> corresponding to the selected error detailed data such as "IOTableCheckSumError" as "Bit" data specified by Type. Also since AddToErrorCode of <Error> is TRUE, the simulation engine interface of the virtual PLC is instructed to set the value 80F4 obtained by adding the value of Value to ErrorCode 80F1 of <Error>. Moreover, the simulation engine interface of the virtual PLC is instructed to switch ON ErrorFlag AR40115 of <Error>.

It is also registered in the error generation table of FIG. 6 that error has been generated. At the same time, a record of error generation is displayed in the Error Simulation Log area. The color of the column of the memory error on the display screen of FIG. 7 is changed so as to be indicative of the completion of error generation.

Next, a different execution format is explained. In the case of a display application for monitoring and displaying the memory status of a PLC, for example, there are situations where it is desirable to prescribe which error should be processed with priority when a plurality of errors are simultaneously generated and to check whether it is being operated according to the prescription. In such a situation, the error simulation is capable of generating a plurality of errors simultaneously.

Figure 21:
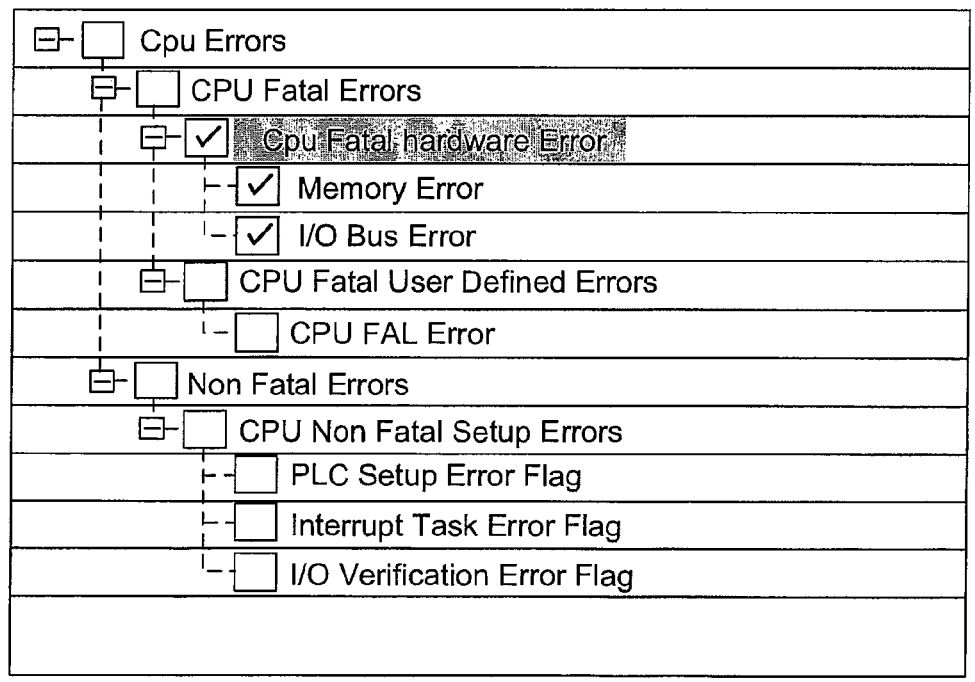
FIG. 21 shows a screen image for having a plurality of errors selected simultaneously.
Figure 22:
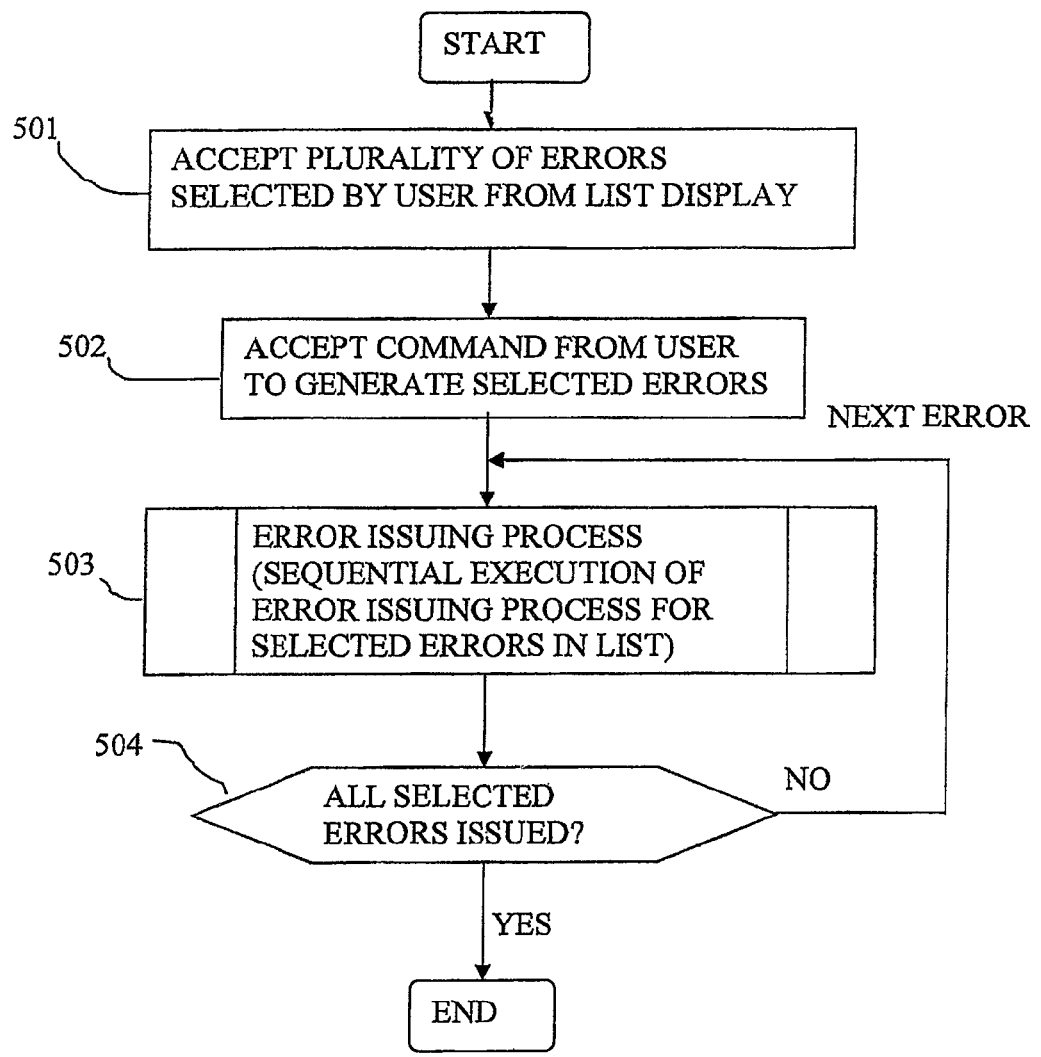
FIG. 22 is a general flowchart of the process for making a plurality of errors simultaneously selectable.
Figure 23:
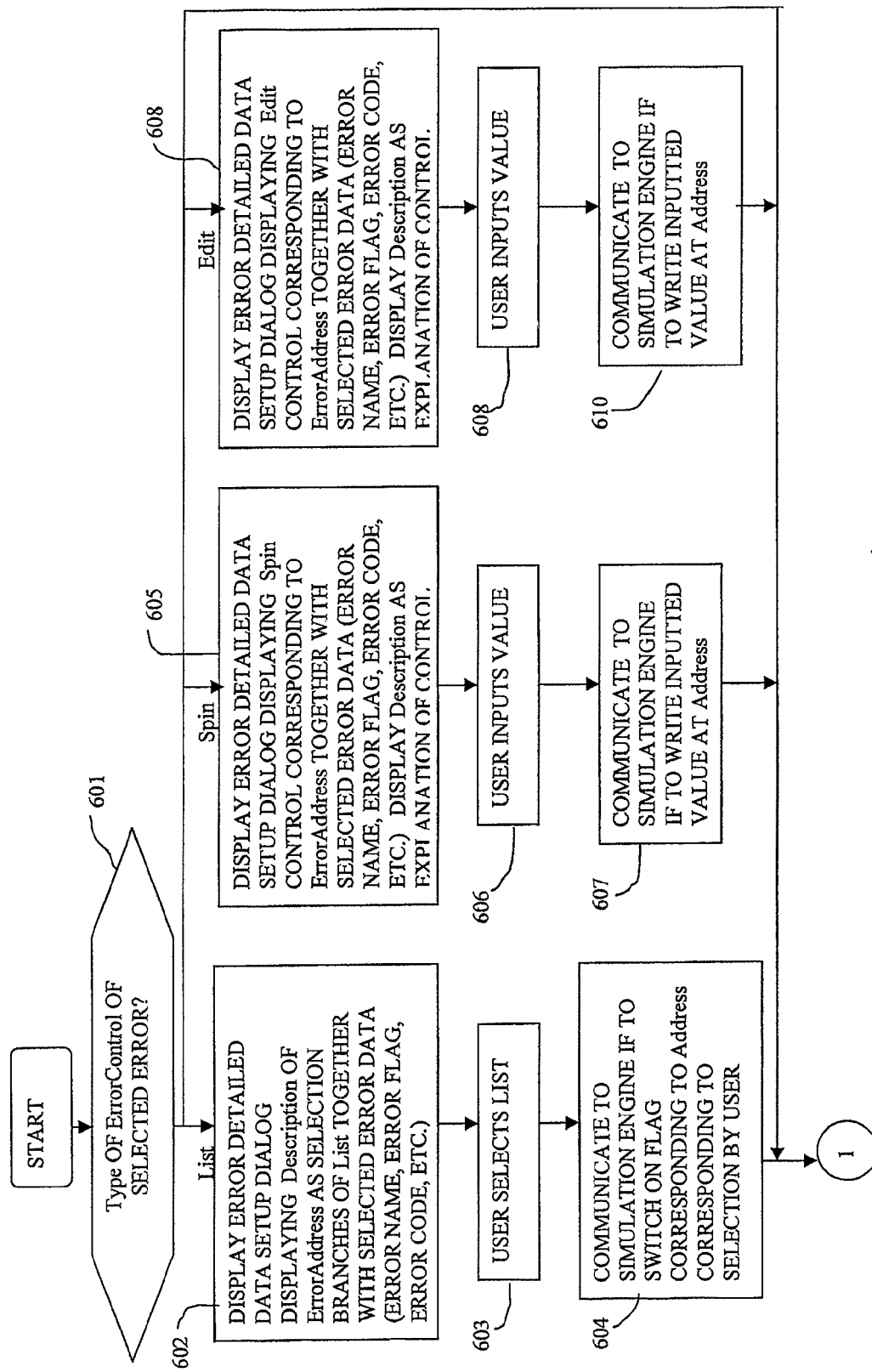
FIGS. 23 and 24 are a flowchart showing the details of the error issuing process.
Figure 24:
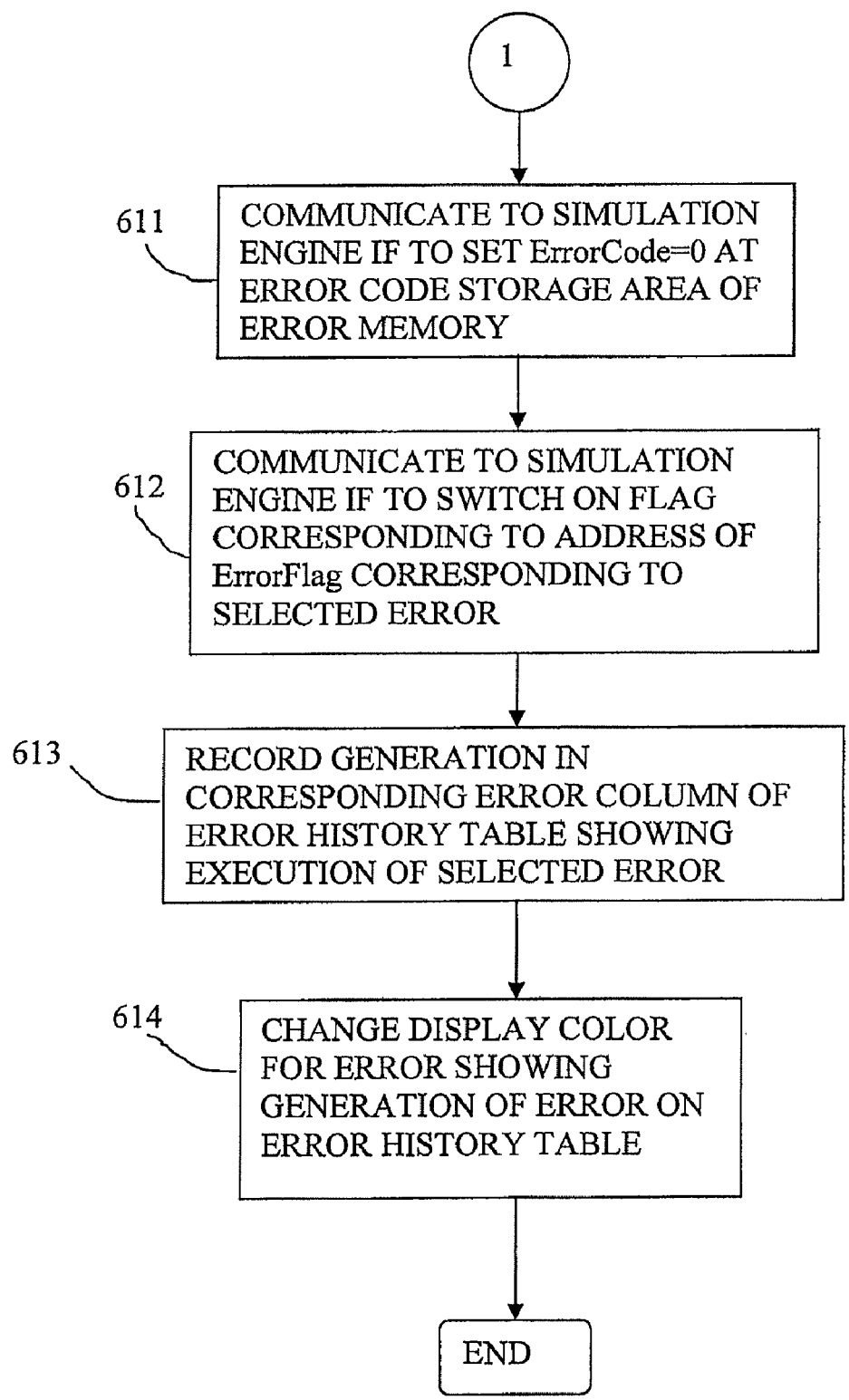
Figure 25:
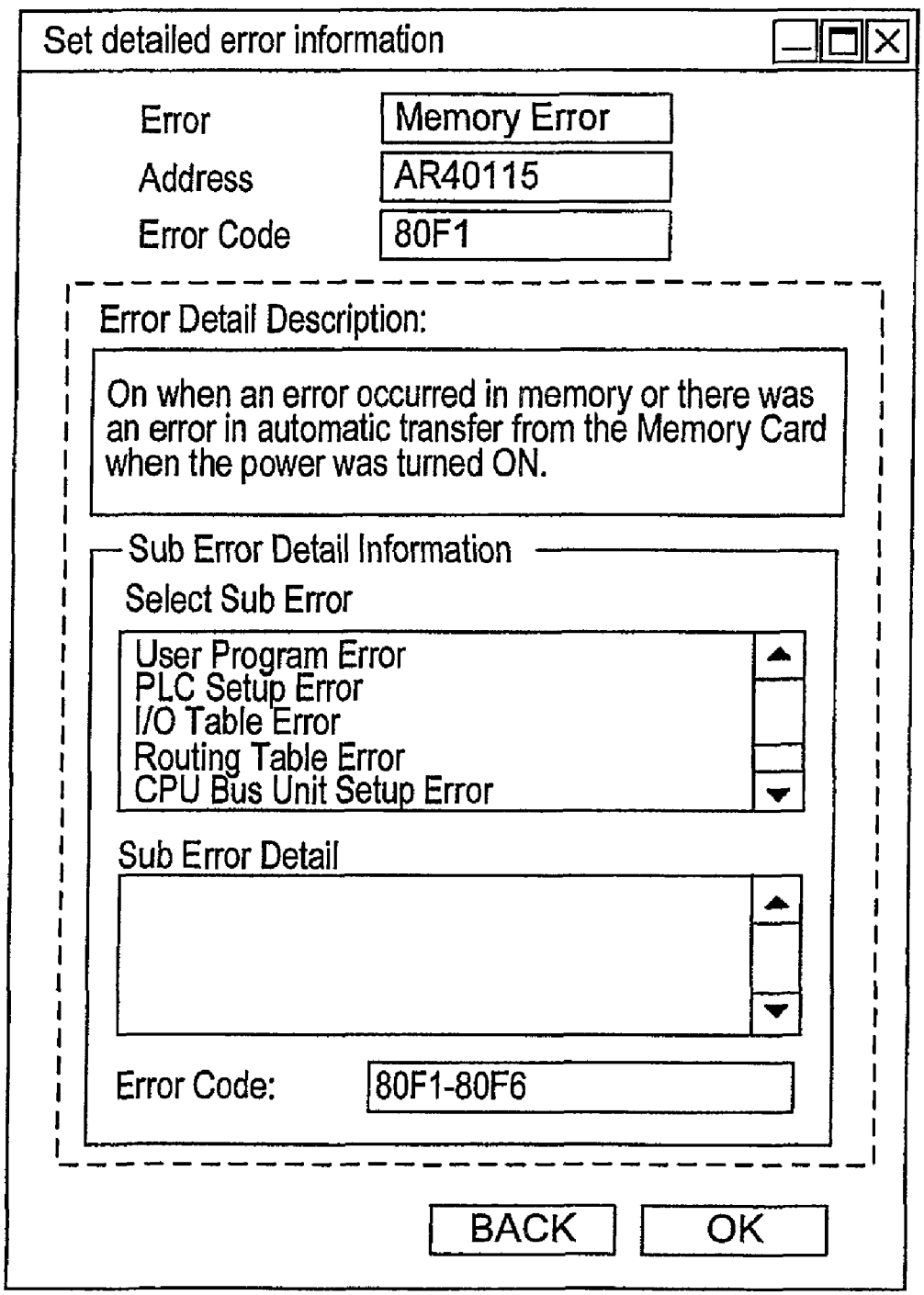
FIG. 25 is a drawing that shows an example of the screen image of the error detailed data setup dialog.

FIG. 21 shows a screen image for having a plurality of errors selected simultaneously, and the process for making a plurality of errors simultaneously selectable is shown in the flowcharts of FIGS. 22, 23 and 24. FIG. 25 is a drawing that shows an example of the screen image of the error detailed data setup dialog.

As this process is started, the user's selection of a plurality of errors is firstly accepted on the list display of errors that can be generated (Step 501), and then a user's command to generate the selected errors is accepted (Step 502). The command by the user to generate the errors is carried out by operating the Generate Error button. As the command to generate errors is given, the error issuing process is carried out (Step 503), and it is next determined for each of the selected errors whether the error issuing process has been carried out (Step 504). Step 503 is repeated until the error issuing process has been carried out on all of the selected errors (YES in Step 504) and the process is completed.

FIGS. 23 and 24 are a flowchart showing the details of the error issuing process. As this process is started, the type of the selected ErrorControl is determined first (Step 601). If the selected type is List, an error data detail setup dialog displaying Description of ErrorAddress together with the selected error data (error name, error flag, error code, etc.) as selection branches of List is displayed (Step 602) for causing the user to select a list (Step 603) and a communication is made to the simulation engine interface to switch ON the flag of the address corresponding to the selection by the user (Step 604). If the selected type is Spin, Spin control corresponding to ErrorAddress together with the selected error data (error name, error flag, error code, etc.) is displayed, an error data detail setup dialog is displayed, and Description is displayed as the explanation of Spin control (Step 605). Next, the user is caused to input a value (Step 606) and a communication is made to the simulation engine interface to write the value inputted by Spin control at the address (Step 607). If the selected type is Edit, an error data detail setup dialog displaying Edit control corresponding to ErrorAddress together with the selected error data (error name, error flag, error code, etc.) is displayed, and Description is displayed as the explanation of Edit control (Step 608). Next, the user is caused to input a value (Step 609) and a communication is made to the simulation engine interface to write the value inputted by Edit control at the address (Step 610).

As the communication to the simulation engine interface in Step 604, 607 or 610 is completed, a communication is made next to the simulation engine interface to set ErrorCode=0 in the error code storage area of the error memory (Step 611) and to switch ON the flag corresponding to the address of Error-Flag corresponding to the selected error (Step 612). Next, the error generation is recorded in the corresponding error column of the error history table for showing that the selected error has been carried out (Step 613) and the process of FIGS. 23 and 24 is concluded by changing the color of display for the errors showing the issuing of error in the error history table.

Although several methods may be considered for selecting a plurality of errors simultaneously, a check box may be prepared for each error, as shown in FIG. 21 such that those with the check box switched on are to be generated as error.

Errors may be shown hierarchically, as shown in FIGS. 11 and 21. In FIG. 11, for example, both operation stop error (CPU_OperationStopError) and operation continuation error (CPU_OperationContinuationError) are in CPU error and memory error, IO bus error and cycle time over are in CPU error. When these errors are generated, it is possible to cause certain error groups to be generated together.

In FIG. 21, both "Memory Error" and "I/O Bus Error" are in "CPU Fatal hardware Errors". If both "Memory Error" and "I/O Bus Error" are to be generated, it is possible to select the check box in front of "CPU Fatal hardware Errors" to select all of the errors "CPU Fatal hardware Errors" and below.

If the user has selected "CPU fatal hardware Errors" in FIG. 21 (by checking the corresponding box), for example, it is determined whether or not there is an error on the child level. If it is determined that there is an error on the child level, it is further determined whether or not there exists an error on the grandchild level, corresponding to this error on the child level. This process is recursively carried out such that all check boxes for the existing errors become checked. With this process completed, the check boxes of "Memory Error" and "I/O Bus Error" below "CPU fatal hardware Errors" become switched on.

Figure 26:
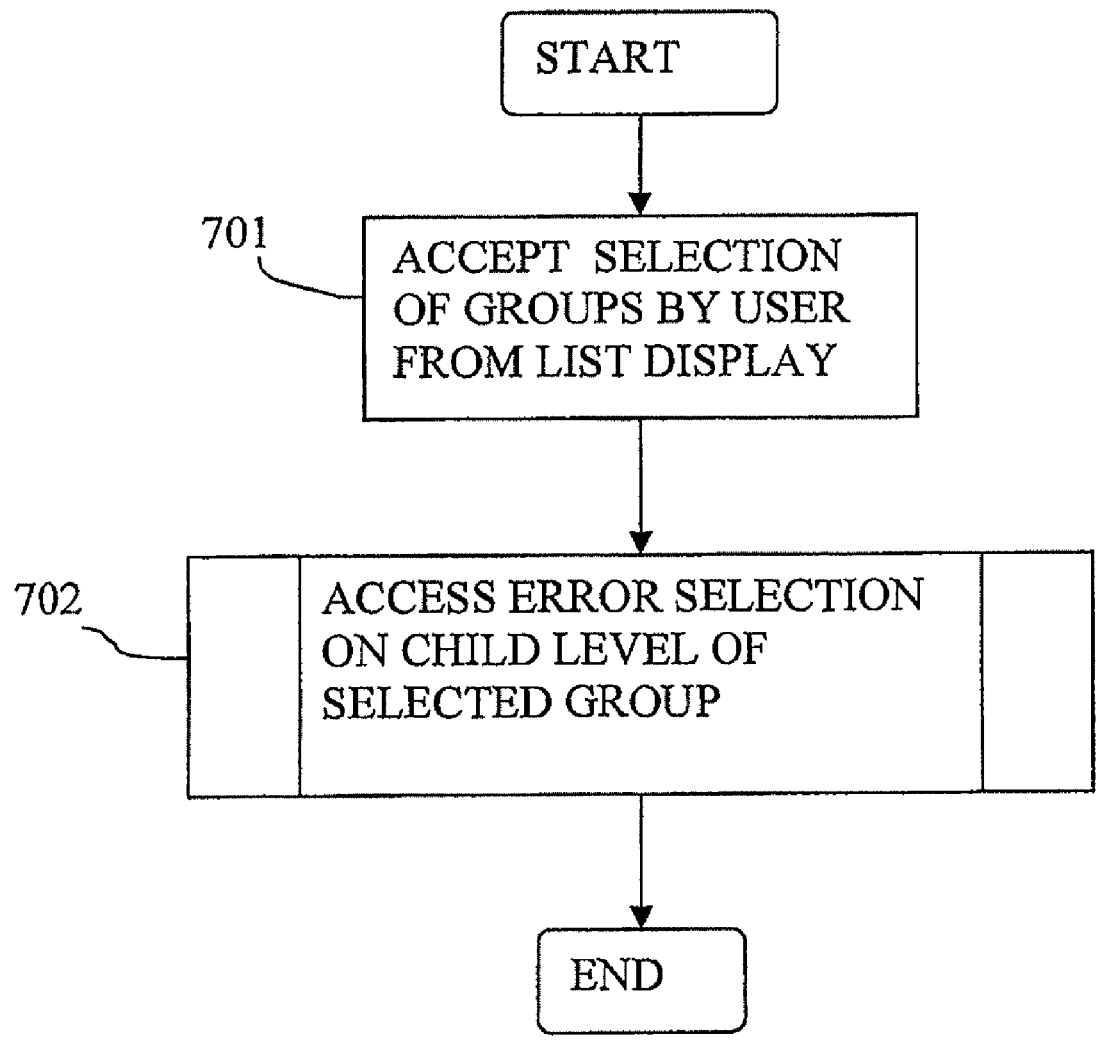
FIG. 26 is a general flowchart showing the outline of the process for selecting a plurality of child levels simultaneously by selecting one error group.

FIG. 26 is a general flowchart that shows the outline of the process for selecting a plurality of child levels simultaneously by selecting one error group. As this process is started, the user selects a check box to select from a list a group of errors to be generated (Step 701) and the error selection process is carried out on the child level for the selected group (Step 702).

Figure 27:
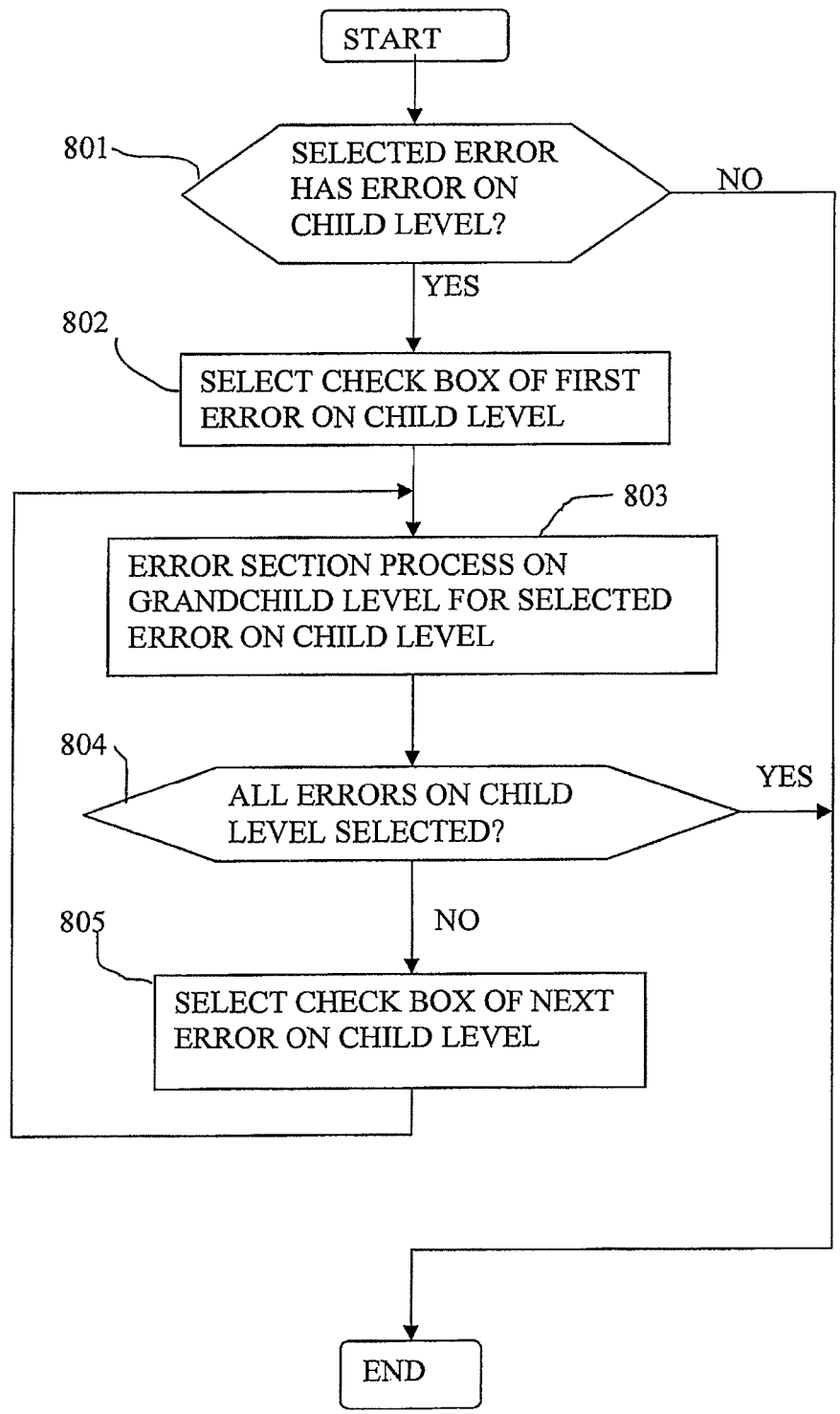
FIG. 27 is a flowchart showing the details of the child level error selection process.
Figure 28:
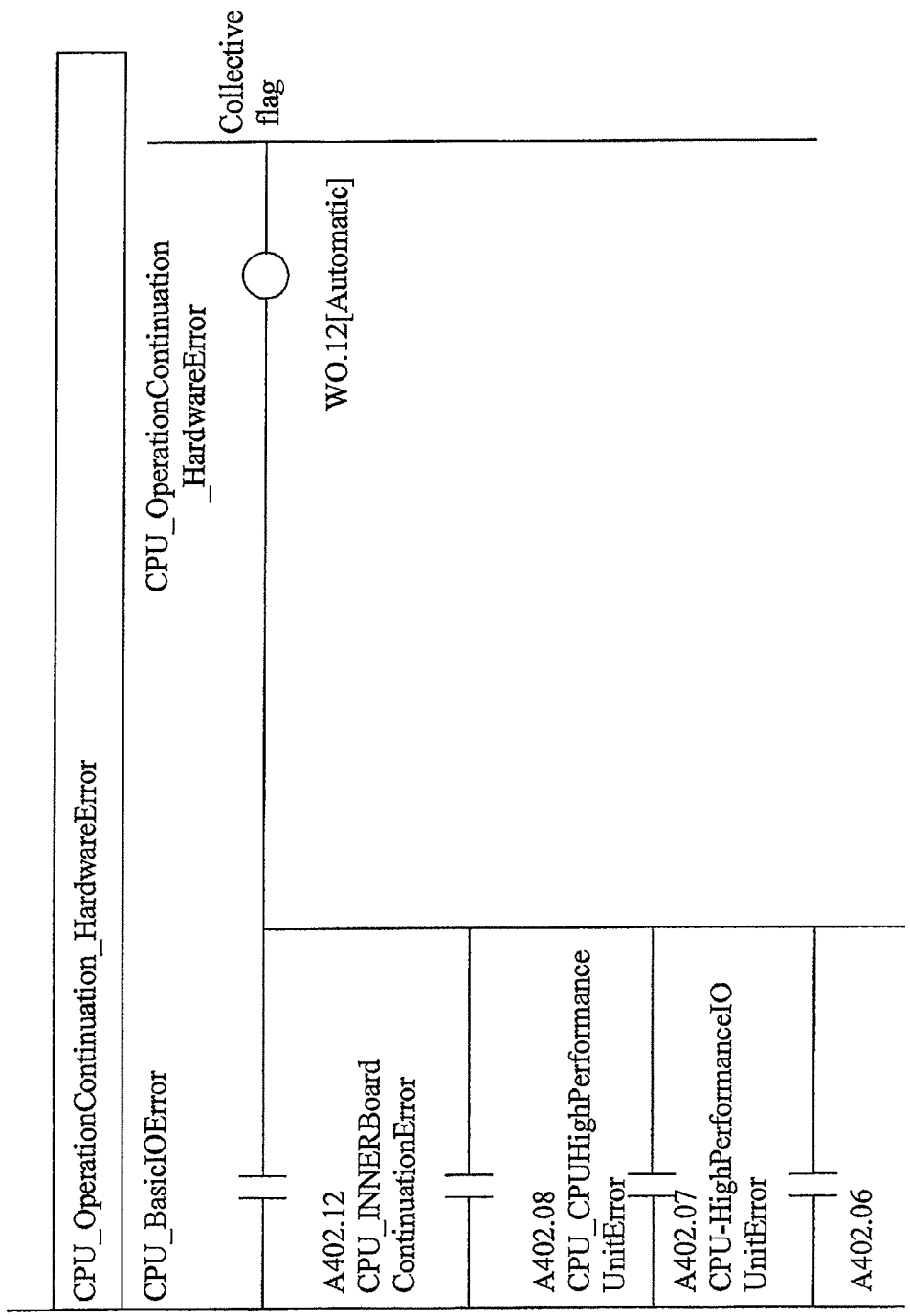
FIG. 28 is an example of user program for detecting the occurrence of an error.
Figure 29:
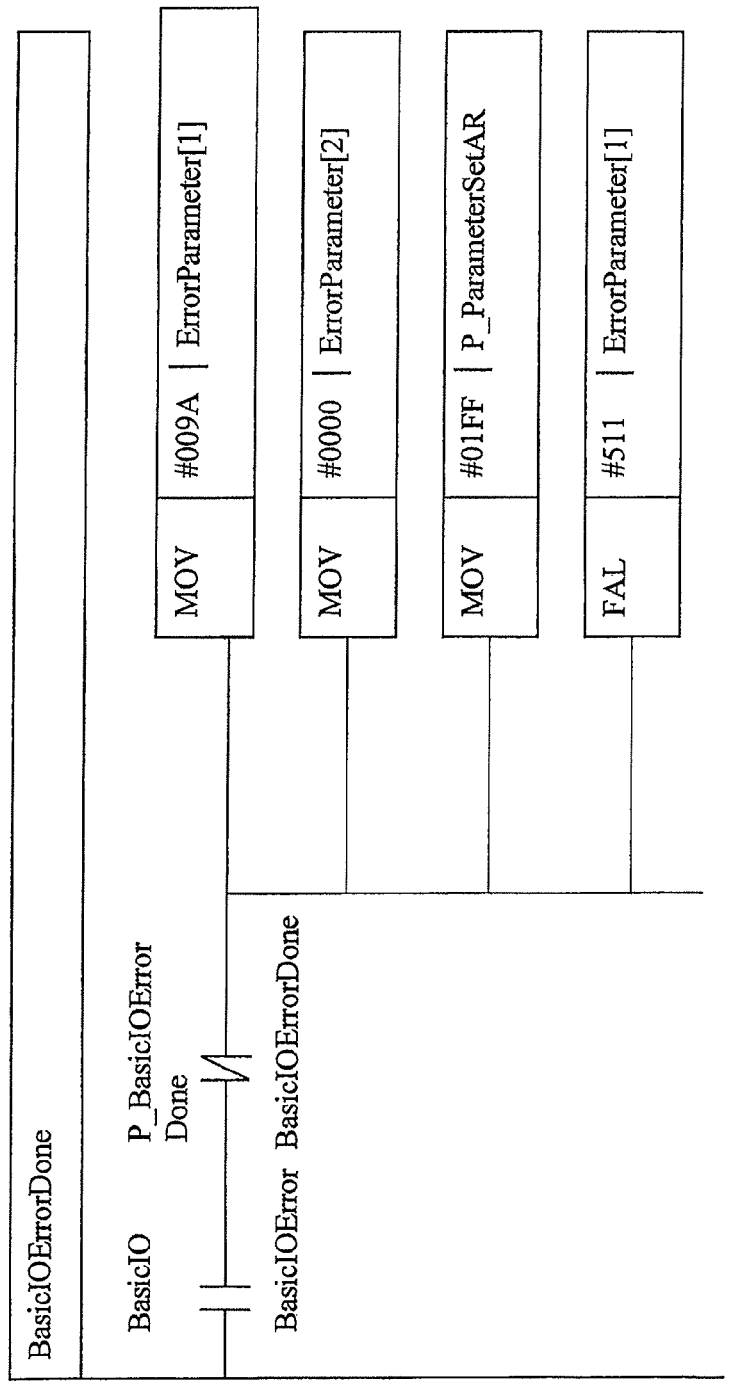
FIG. 29 is an example of user program for generating an error in a simulated way.

FIG. 27 is a flowchart showing the details of the child level error selection process. As this process is started, it is determined first of all whether or not the selected error has any error on the child level (Step 801). If there is no error on the child level (NO in Step 801), this process is terminated. If there are errors on the child level (YES in Step 801), the check box of the first error on the child level is selected (Step 802), and the grandchild level error selection process of the selected error on the child level is carried out (Step 803). It is determined next whether all errors on the child level have been selected or not (Step 804). If not all errors on the child level have been selected (NO in Step 804) another one on the child level is selected (Step 805). This is repeated until all errors on the child level have been selected.

With a simulation device for a PLC according to this invention, the specification of the error memory provided by this PLC becomes easily understandable. The logical value of a desired error bit can be varied to another value corresponding to an error by a simple operation without incorporating any dedicated logic for generating any error into a ladder program unlike the situation of using a dedicated error-generating command. Thus, the danger of unexpected wrongful operation by forgetting to carry out the restoration work when returning from the debug mode to the operating mode can be eliminated.

What is claimed is:

1. A simulation device for a programmable controller, said simulation device comprising a processor, memories and a display having a screen, and serving to realize by software a virtual PLC for emulating operations of a real PLC, a tool that functions as a development aid device for said virtual PLC and an error simulator for emulating an error that occurs in said virtual PLC;
    wherein said virtual PLC comprises:
        a virtual communication unit for providing a virtual communication function with said tool;
        a PLC type data memory for storing type data of PLC to be emulated which are received from said tool through said virtual communication unit;
        a PLC simulation engine for emulating operations of PLC of a type corresponding to PLC type data stored in said PLC type data memory;
        a PLC virtual memory comprising a user memory for storing a user program which is carried out by said PLC simulation engine, an error memory for storing error data individually for each of error items, said error data indicating presence and absence of occurrence of various error items inclusive of hardware errors and communication errors occurring in said PLC, and an input-output memory for storing input-output data; and
        a simulation engine interface for providing a function of allowing an access from said error simulator to said virtual PLC without passing through said virtual communication unit;
    wherein said error simulator comprises:
        a PLC error data memory by type for storing PLC error data inclusive at least of the relationship between error items that can be generated in said PLC and addresses in the error memory in said virtual PLC storing data on presence and absence of error generation related to said error items;
        a type data taking part for taking in PLC type data from said PLC type data memory through said simulation engine interface;
        a type dependent data taking part for taking in, from said error data memory by type, PLC type data of a type corresponding to the type data taken in through said type data taking part;
        a display part for causing a user to select an error item and to specify presence and absence of error generation of said error item by making a list display, on said screen, of the error items comprising PLC error items taken in through said type dependent data taking part; and
        a simulator PLC writing part for writing in data corresponding to the specification of presence and absence of error generation at a corresponding address in said error memory of said virtual PLC through said simulation engine interface when the selection of said error items and the specification of presence and absence of error generation are carried out by specified user operations; and
    wherein said simulation device functions to set, without any operations by said tool, a specified condition at a corresponding address in the error memory of said virtual PLC by carrying out a specified error selection operation and a specified operation regarding presence and absence of error generation, based on a list display of error items on the screen, after causing desired PLC type data stored in the PLC type memory in said virtual PLC through said tool.

2. The simulation device of claim 1 wherein said display part of said error simulator serves to display, as a list on the screen, the relationship between error items and addresses of the error memory such that those of said error items selected and not selected by said user and the specified condition of presence and absence of error generation become visually distinguishable.

3. The simulation device of claim 2 wherein said PLC error data memory by type of said error simulator stores not only the relationship between the error items and the addresses in said error memory but also text data showing contents of meaning of each of error items, and said display part of said error simulator serves to display, as a list on said screen, also the error items inclusive of sentences indicative of said contents of meaning of said error items, based on said text data.

4. The simulation device of claim 2 wherein said PLC error data memory by type of said error simulator stores a plurality of error items generated in individual PLC types inclusive of hierarchical structure, and said display part of said error simulator displays the error items, as a list on said screen, in a display format that clearly shows said hierarchical structure.

* * * * *